United States Patent

[11] 3,617,222

[72] Inventor Claude Matte
Paris, France
[21] Appl. No. 728,189
[22] Filed May 9, 1968
[45] Patented Nov. 2, 1971
[73] Assignee Centre National de la Recherche Scientifique and Centre National de Transfusion Sanguine
Paris, France
[32] Priorities May 11, 1967
[33] France
[31] 106,180;
Mar. 22, 1968, France, No. 145,043

[54] METHOD AND APPARATUS FOR ANALYZING LIQUID SUBSTANCES LIKELY TO FORM AGGLUTINATES
38 Claims, 36 Drawing Figs.

[52] U.S. Cl. .................................................. 23/230 R,
23/253 R, 23/230 B, 356/39, 356/208, 424/11

[51] Int. Cl. ................................................. G01n 33/16,
G01n 31/00
[50] Field of Search .................................... 23/230,
253, 259; 356/39; 424/11

[56] References Cited
UNITED STATES PATENTS
3,432,268  3/1969  Unger .......................... 23/230
3,463,614  8/1969  Leslie .......................... 23/230

Primary Examiner—Morris O. Wolk
Assistant Examiner—R. E. Serwin
Attorney—Stevens, Davis, Miller & Mosher ABSTRACT: An apparatus and method of testing and classifying materials which contain agglutinates includes mixing samples of the material with one or more reagents, and subjecting the resulting mixtures to at least two agitation operations in a cup-shaped container. One such operation is carried out at high speed to disperse macroagglutinates and the other at low speed to settle the agglutinates in the center of the cup-shaped container. By inspection of the containers after the agitation operations, and by inspection of comparison samples of the materials in question, properties of the materials under test may be deduced. The principal use of the method is in blood type and group determination. Apparatus is also provided for automatically carrying out the above method.

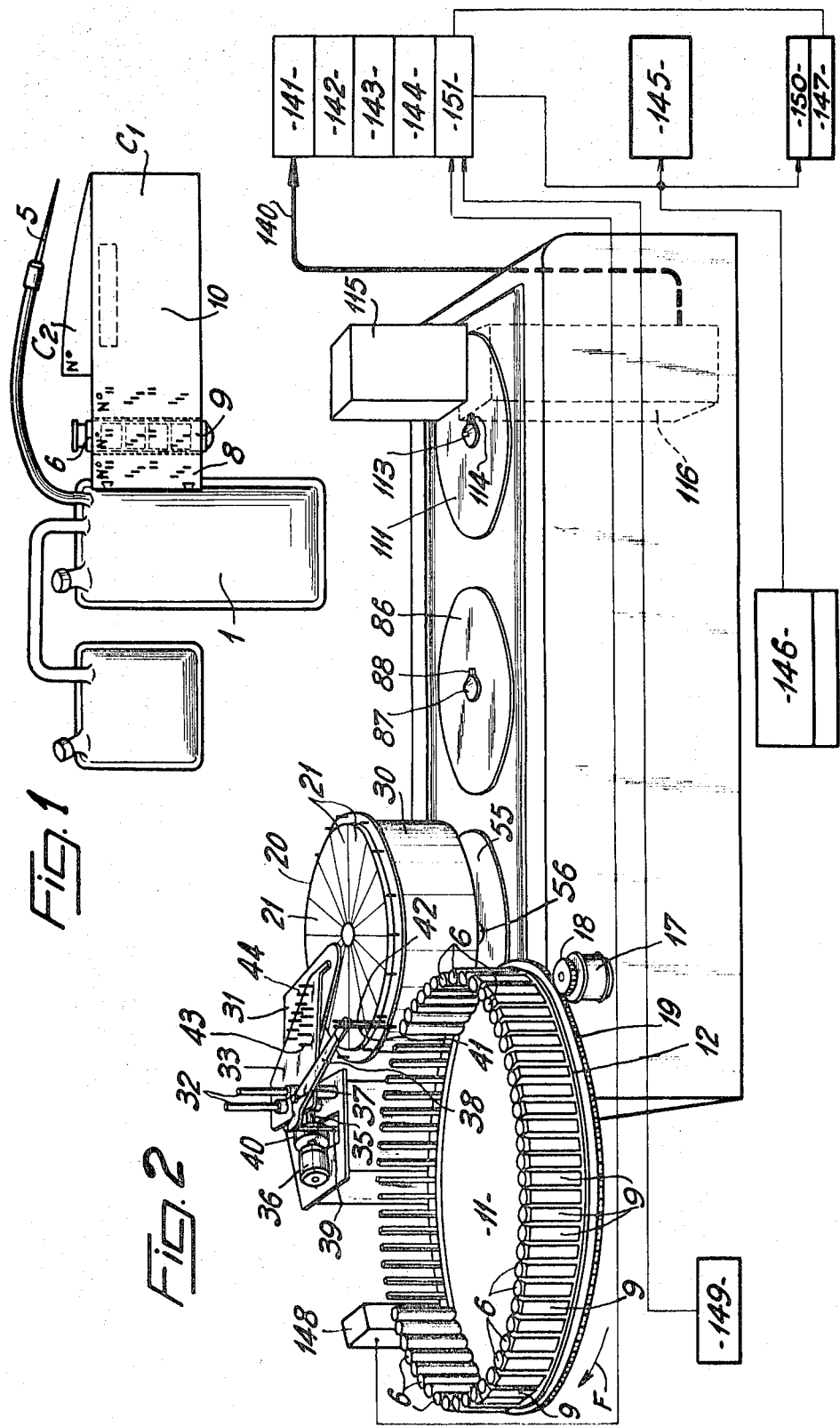

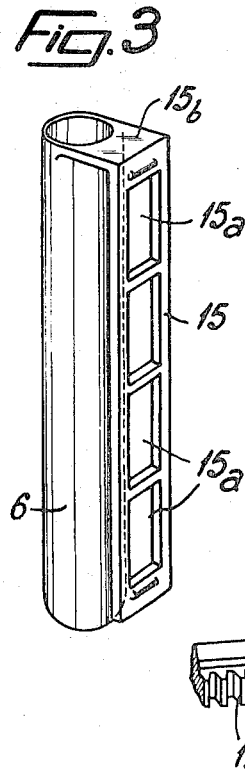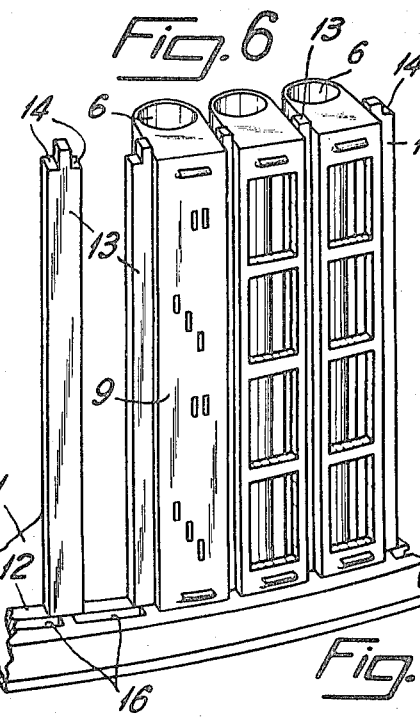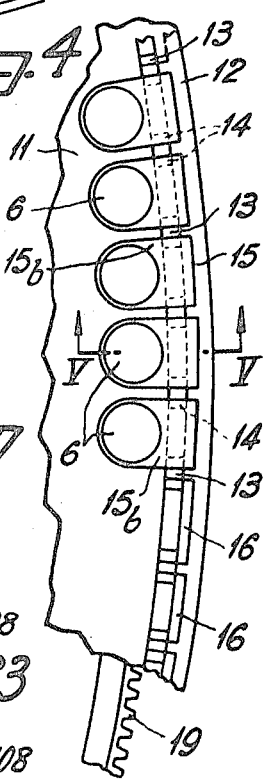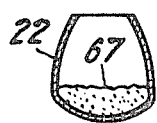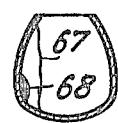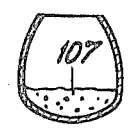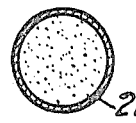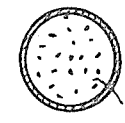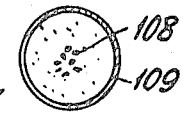

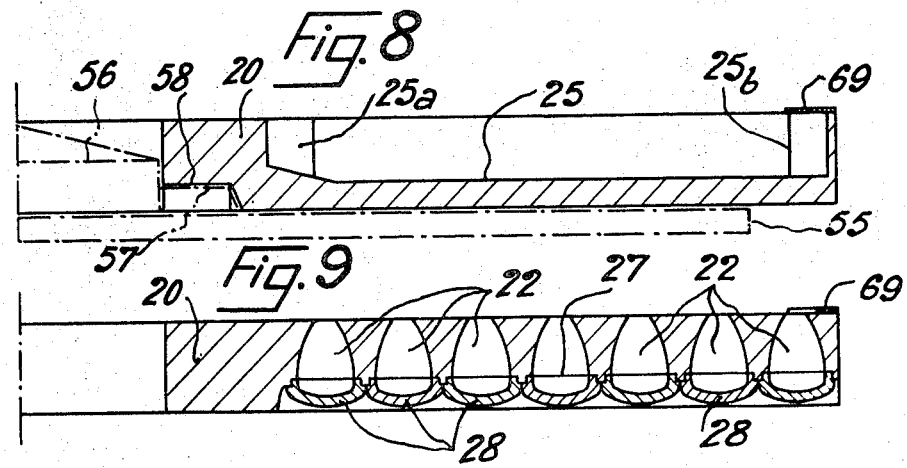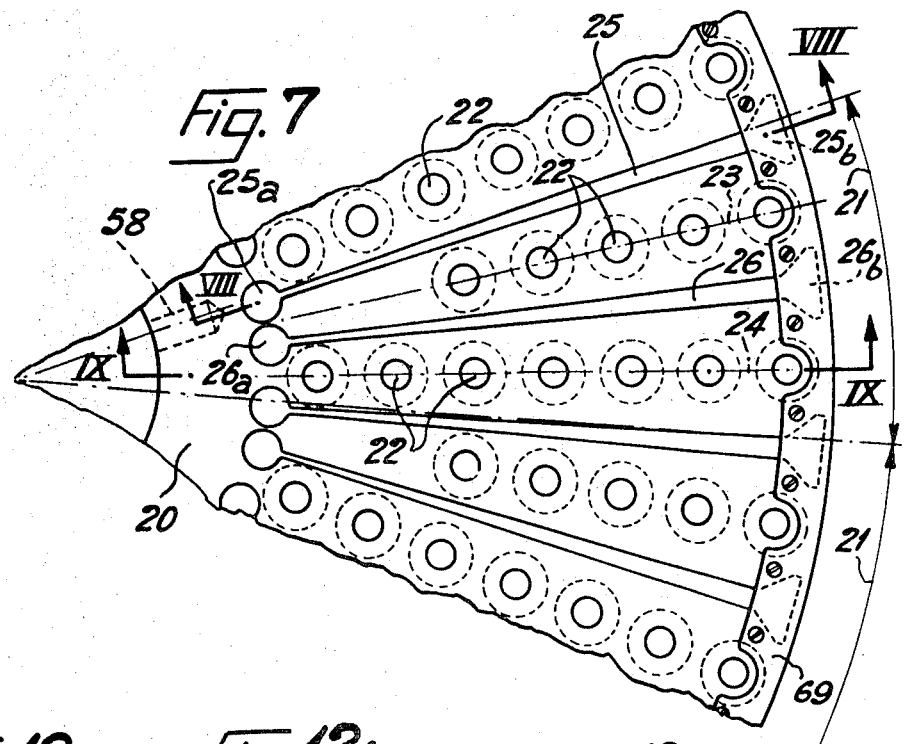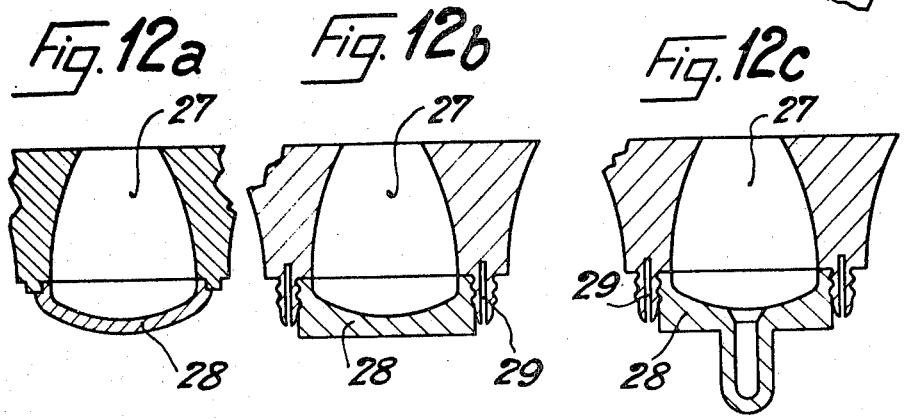

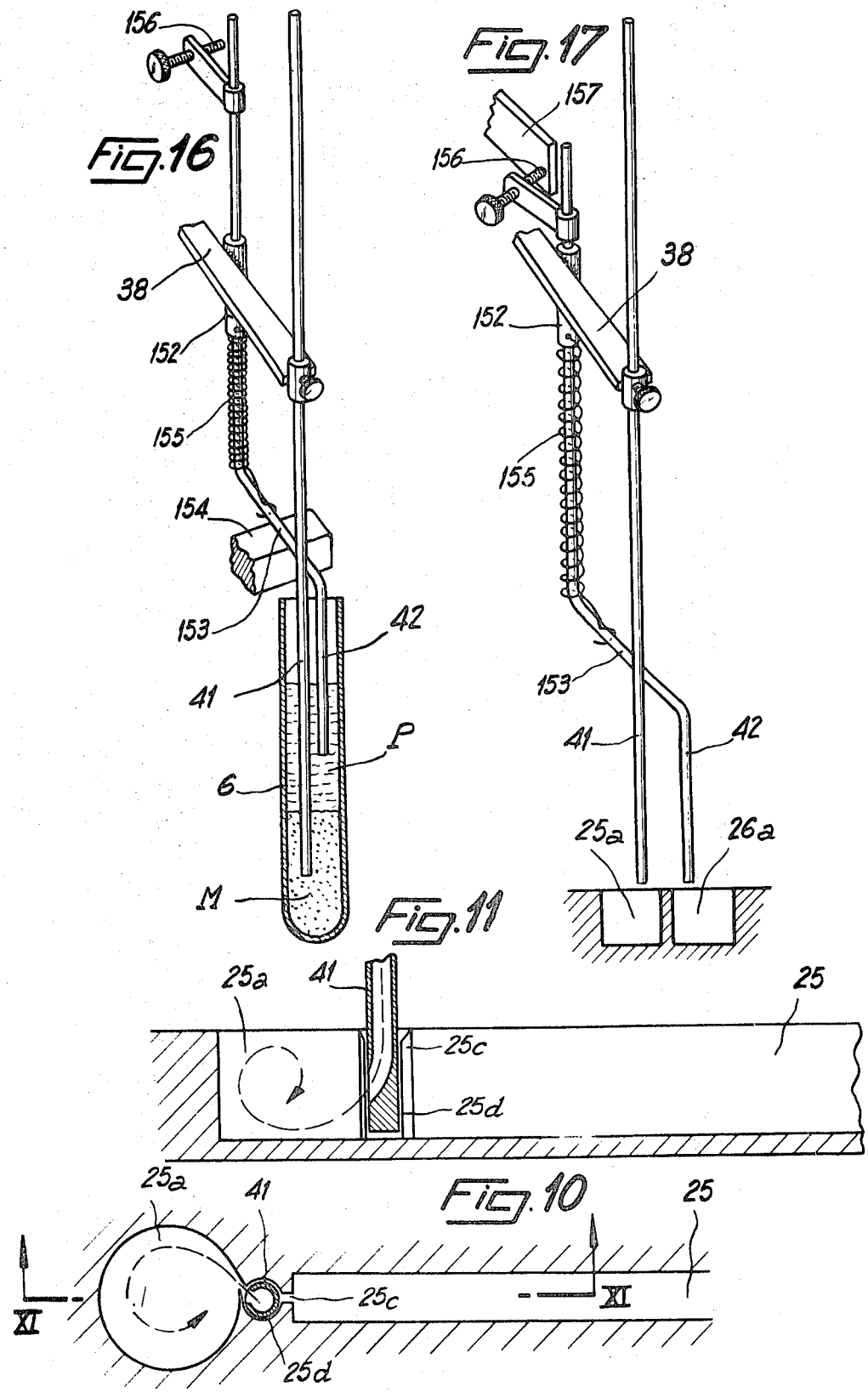

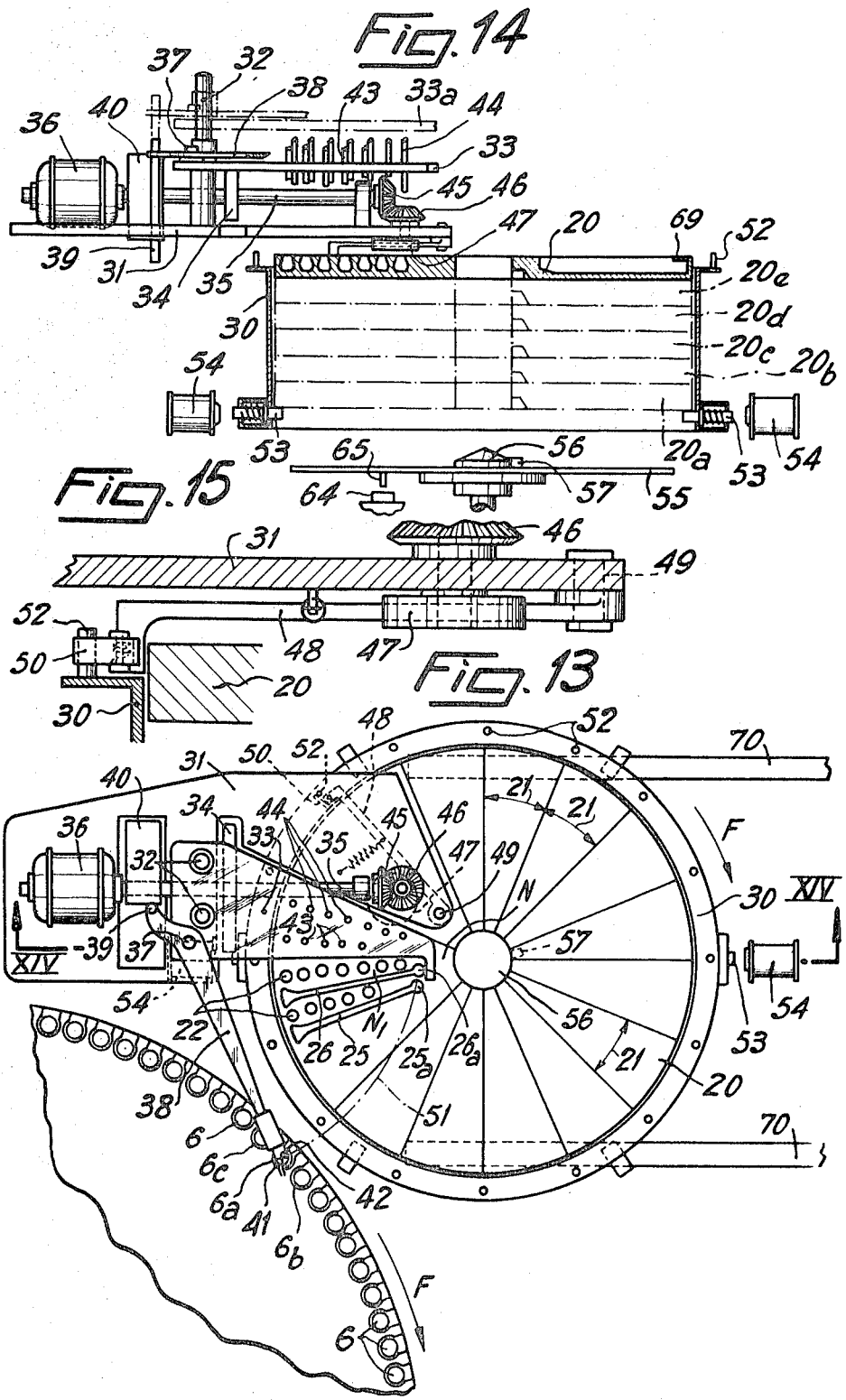

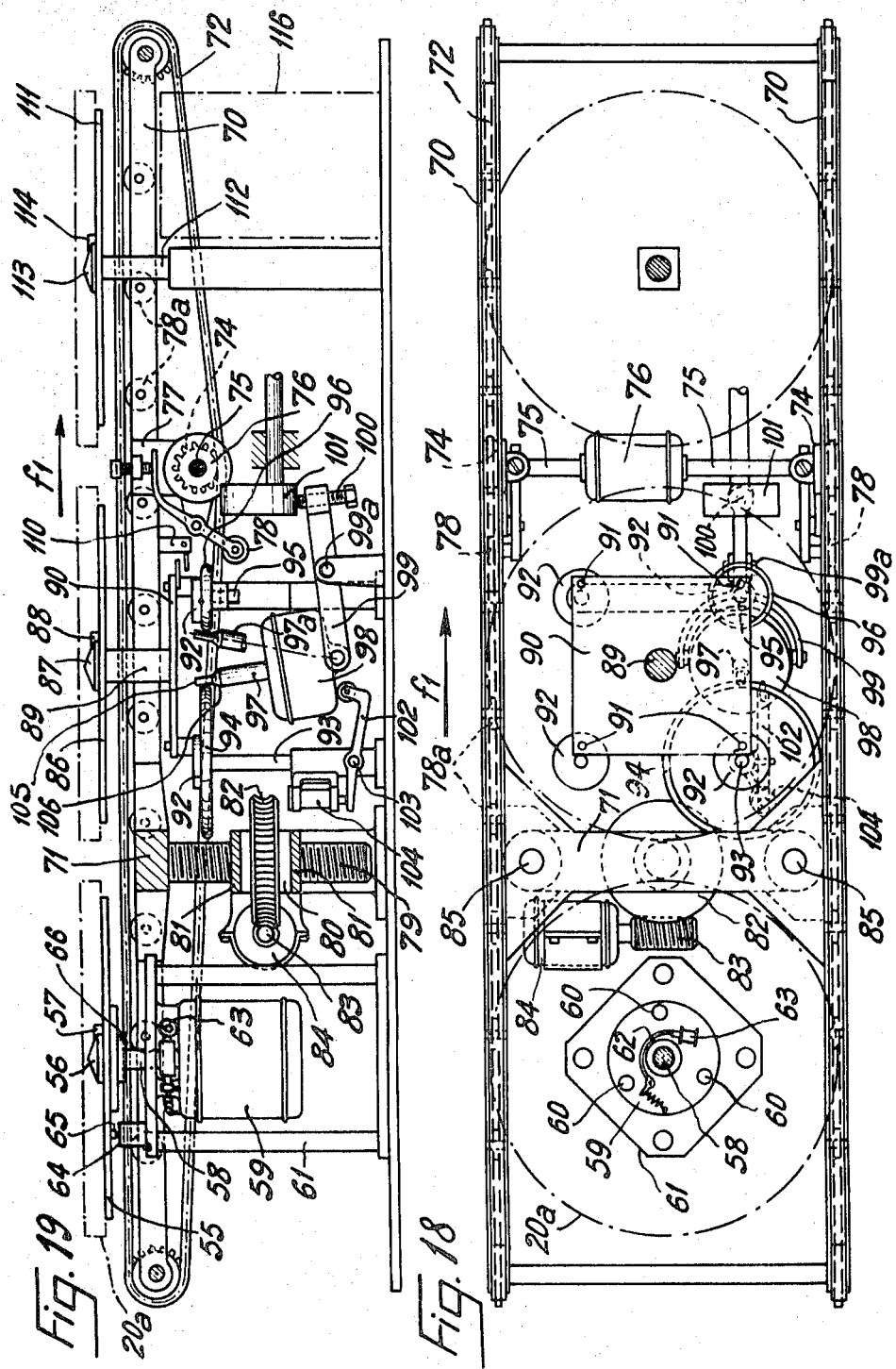

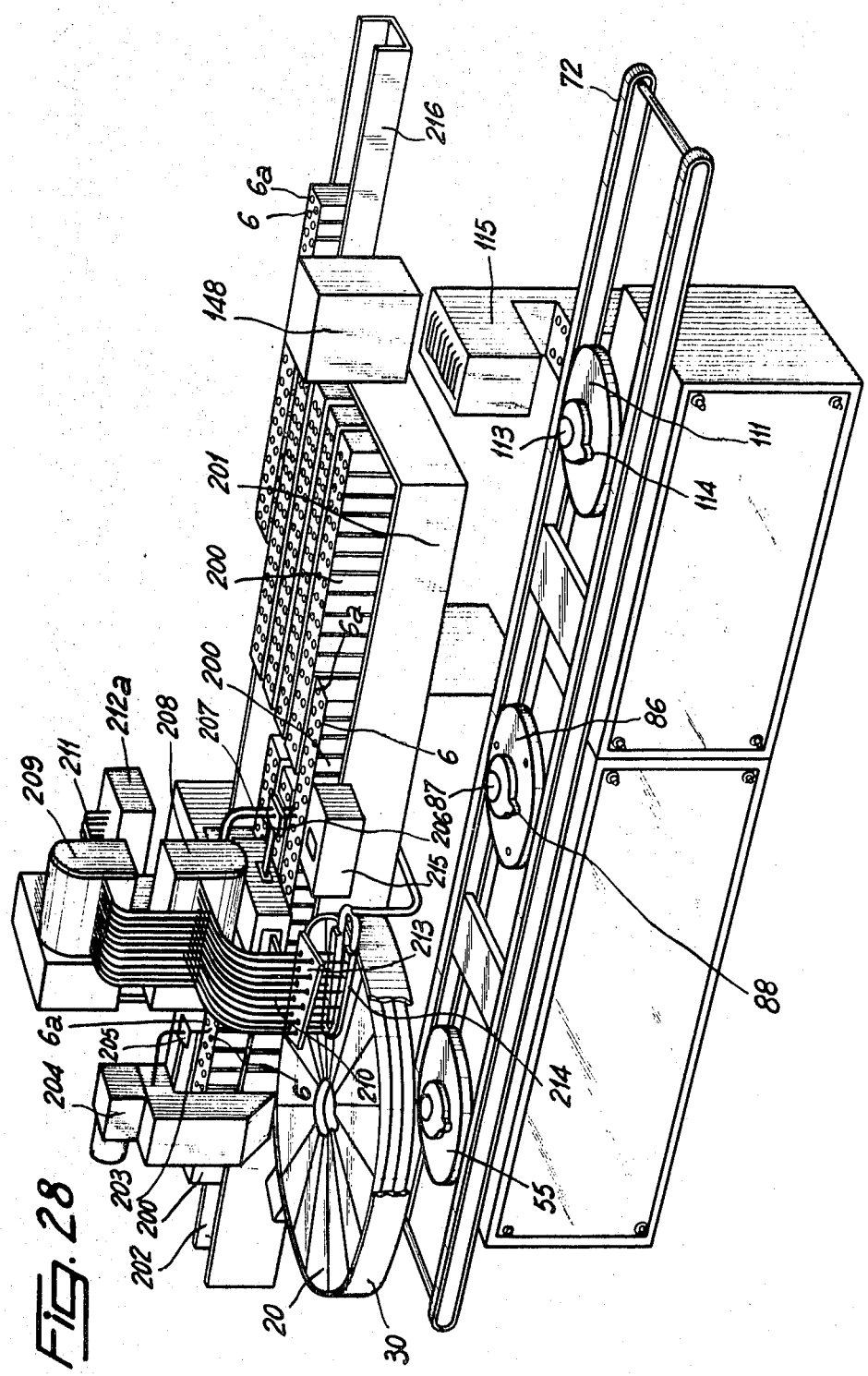

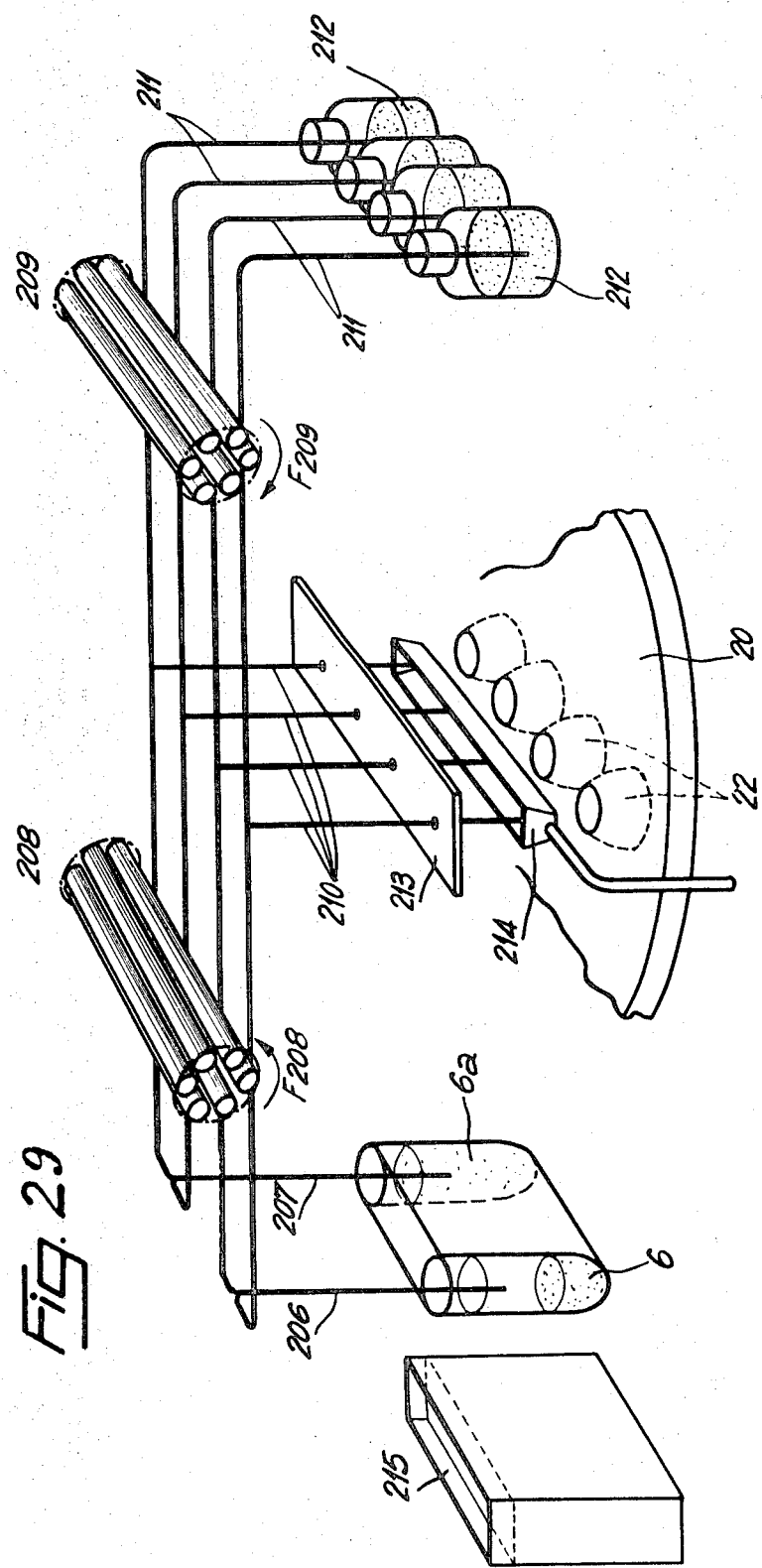

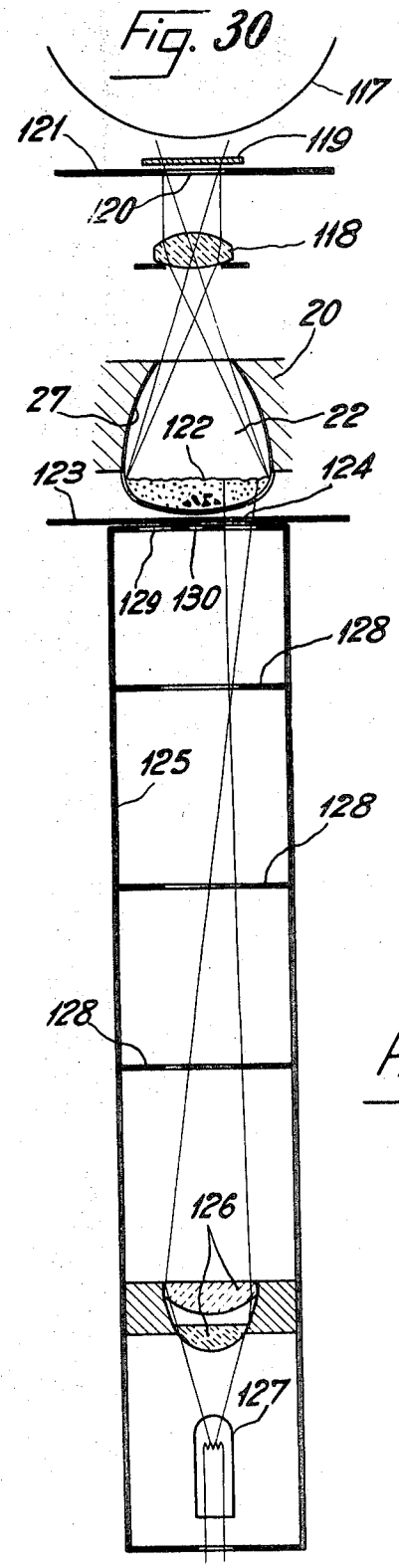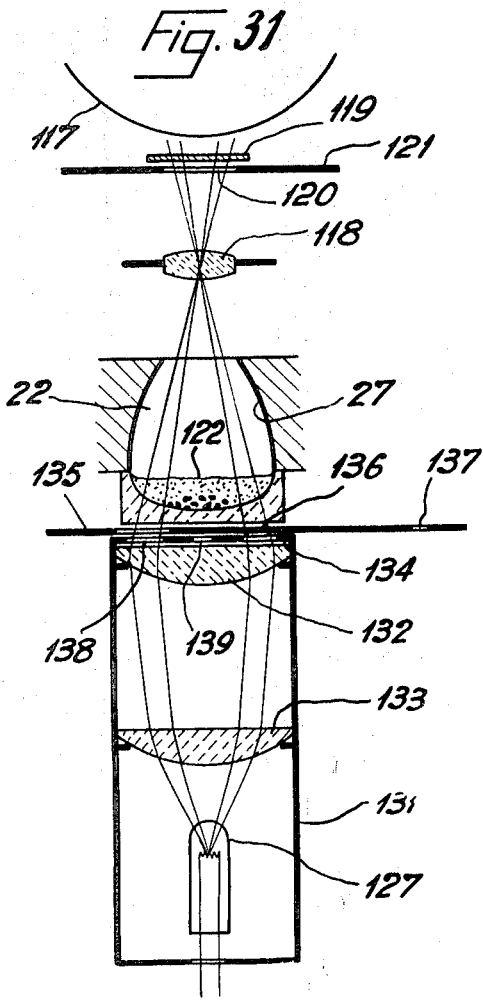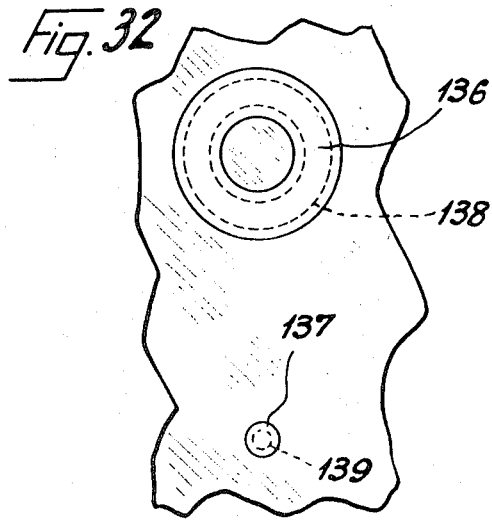

METHOD AND APPARATUS FOR ANALYZING LIQUID SUBSTANCES LIKELY TO FORM AGGLUTINATES

The present invention relates to a method and apparatus for analyzing liquid substances likely to form, with certain appropriate reagents, agglutinates. Generally, when these occur, they are of varying sizes and one can distinguish microagglutinates (not visible to the naked eye) and macroagglutinates (visible to the naked eye).

Such a method and such a device are, of course, particularly well adapted to the determination of erythrocyte types and plasma blood groups, to serodiagnosis of certain illnesses such as typhoid and syphilis, and to the detection of the rheumatiod factor by means of sensitized particles as, for example, latex of polystyrene.

The present invention enables an automatic examination of reactions to be carried out with a view to determining certain characteristics which are useful in hematology, serology, bacteriology or chemistry and more particularly to determine blood groups, automation serving essentially to minimize risk of errors in interpretation and transcription of results, whilst sensitivity and speed of reactions are increased.

Thus, for example, determination of a blood group for an individual is carried out by means of several complementary reactions each using an agglutination of red cells. For some of these, the red cells of the person being examined are placed in contact with a series of reagents called "test-serums" which are serums which each agglutinate a well defined and different kind of cell.

For other reactions, the serum of the patient is placed in contact with a series of "test cells", that is those where the group is already known. The various combinations of agglutination or nonagglutination which finally occur in the two series of reactions each define a blood group.

Cells never agglutinate entirely. Some free cells always remain in a greater or lesser quantity. Their presence, when they are suspended in a liquid substance, gives to the latter a turbidity which can be measured photometrically (if steps are taken not to be hindered by opacity due to the agglutinated cells themselves). This turbidity is obviously dependent upon the number of cells unit of volume: the greater the agglutination, the greater the transparency of the medium in which the agglutinated material rests.

The invention enables agglutinations to be detected either by nephelometry if a very small quantity of reactive cells have been used, or by opacimetry if a fairly strong dose of cells has been used. This opacimetry can be obtained either on a peripheral annular zone of the reaction vessel or on a small central zone, it being understood that the more intense the agglutination the more cells are collected in the center of the reaction vessel and the more transparent is the peripheral zone.

The method of this invention is characterized by having, in a cup with a transparent bottom, preferably concave in shape, the liquid substance to be analysed, with at least one reagent added with which it is susceptible of forming agglutinates, and subjecting this to at least two successive agitations, the first having a greater speed and the second a slower speed than a critical speed over and under which the macroagglutinates are respectively dispersed in the medium then collected near the center of the said transparent bottom, after which is measured by turbidimetry, that is by opacimetry (and/or nephelometry), and approximately in parallel relationship to an orthogonal axis to said bottom near the center thereof the opacity of the central and/or peripheral part of the said substance, the measurement by turbidimetry being carried out with reference to that of a test-medium to which the same treatment is imparted. Preferably the cup has a rotational symmetry axis and the shape of a brandy glass, glass, that is a cupula-shaped bottom connected to inclined sides parting from the symmetry axis of the said cup, so that the latter has an enlarged part near the said bottom.

The method of this invention is based on the discovery of this critical speed which exists for media in which agglutinates appear which are denser than the liquid in which they are contained and which depends on numerous parameters such as the nature and viscosity of the medium, the size of the agglutinates, the dimensions of the cup and its shape, etc. However, it is possible to determine this speed for each particular case experimentally.

Thus, in an apparatus according to the invention, that is having an agitator with two speeds at least, one being greater and the other less than the said critical speed corresponding to the substance to be analyzed, the agitator may comprise a turn-table which is subjected to motion around a circle of diameter 1.10 inches, whilst the vessel is in the shape of a brandy glass having an internal maximum diameter of approximately 0.62 inches (16 mm.) for an aperture diameter of 0.31 inches (8 mm.) and a height of about 0.78 inches (20 mm.) this cup containing a blood of which the blood group has to be determined, this critical speed is found to be around 80 r.p.m.; the higher and lower speeds of the agitator can then be respectively 180 and 60 r.p.m. Obviously these higher and lower speeds can vary greatly in terms of duration of movement.

The agitation at a speed higher than the critical speed disperses the particles uniformly (cells or others) stuck together or not, whereas the agitation at the speed which is less than the critical speed collects, with the aid of gravity, macroagglutinates near the center of the bottom of the cup. Optionally, the particles may be collected together to form a deposit by means of a centrifuge.

It has been found moreover that, after the first two agitations, a third at a speed less than that of the critical speed but closer to it than the speed of the second agitation, enables microagglutinates to be collected in the center at the bottom of the vessel.

These microagglutinates which are not visible before the third agitation become so during this process, uniting together to form an opaque and visible spot.

In the methods known prior to the invention, in order to analyze a liquid medium susceptible of forming agglutinates in the presence of reagents, it was necessary to pour substance and reagent into a test-tubelike vessel and wait for the agglutinates to form and settle and to measure, generally by opacimetric measurements, through the sides of the vessel, the liquid covering the settled agglutinates. Such a method generally requires a large amount of liquid substance and reagent so that the height and thickness of the liquid covering the agglutinates is sufficient to enable useful measurements to be taken, and each analysis takes a considerable time (at least half an hour) as measurements can only be made after complete sedimentation. This method is therefore unsuitable for automatic, rapid and economic sampling and testing.

On the other hand, the method described in the invention enables each individual reaction to be carried out in a few seconds and does not require a lot of the substance to be analyzed or a lot of reagent.

Moreover such a known method cannot also measure by opacimetric measurements the contents of the vessel through its bottom. For if the middle of the vessel should contain some visible dispersed agglutinates, the transparency of the remainder should increase and yet with the known method the increase is imperceptible if the reagent is very dilute. Also, when the substance contains many visible agglutinates, the transparency of the remainder increases, but the agglutinates settle and cover the bottom of the vessel, rendering it opaque. One cannot therefore find a significant law between the quantity of light absorbed in passing into the vessel and the proportion of agglutinates formed. Also, when these agglutinates are large and form a kind of cut-up slab, the measurements are just as hazardous, since, according to the hazards of the dispersion, large agglutinates can, at the moment of being measured by opacimetric measurements, either be side by side and thus absorb a lot of the light going through the substance, or be superimposed or overlapping and thus absorb less light. Thus, as in the previous case, the amount of light absorbed in going through the vessel is not indicative of the proportion of agglutinates formed.

On the other hand, the invention remedies all such difficulties by avoiding the phenomena mentioned above which make measurements either uninterpretable or not sensitive enough.

By means of the second agitation, all visible agglutinates are collected in the middle at the bottom of the cup. The third agitation also gathers in the center of the said concave bottom the non visible microagglutinates, whose size is nevertheless greater than that of the particles of the initial substance to be analyzed. Thus, an opacimetric measurement in the central zone of the bottom makes it possible to detect accurately the presence of agglutinates, even if they are few in number and not detectable (visually or photometrically) individually. Thus, any absorption of light corresponding to a measurement in the central area corresponds to the formation of agglutinates. Such a measurement can therefore give an information 'all or nothein': no absorption or an absorption which is less than a given threshold chosen as significant in terms of the material used means no formation of agglutinates, whereas an absorption greater than this threshold shows that there is formation of agglutinates.

A photometric measurement in the peripheral zone of the bottom makes it possible to obtain a quantitative result (compared with a comparison sample). Since there only remains, in a peripheral zone of the vessel containing the mixture, after the second and a fortiori after the third agitation, very small particles, which are very numerous and are dispersed in a homogeneous manner. Therefore the hazardous character of measurements with overlapping of agglutinates (as mentioned above) disappears completely. Also, after the third agitation, all the microagglutinates are also displaced from the peripheral field of measurement and their parasitic opacity disappears with the difficulties specified above. So, in such conditions, in a system of rectangular coordinates, variations of absorption of a peripheral luminous beam are given on the Y-axis and the quantity of reagent introduced in the cup (related to the increase in number of agglutinates) on the X-axis, giving a continuous graph having three linear sections, the two end ones being practically parallel to the X-axis and the middle section being at an angle. Thus for a quantity of reagents falling within the limits of this middle section there is a simple ratio between quantity of light absorbed and quantity of reagent introduced in the vessel. Therefore, when working within this section of the graph, it is possible to carry out quantitative measurements with reference to known media.

The description which follows with diagrams attached given as a nonrestrictive example, shows how the invention can be used, particularities shown on the diagram and in the text being, of course, part of the invention.

This description is more particularly directed towards the analysis of blood groups, but of course the invention is not restricted to this single type of analysis.

FIG. 1 shows a known blood-sampling kit to which is attached a card with perforations on which are printed identification elements and various other information.

FIG. 2 is a diagrammatic vie in perspective showing a device covered by this invention.

FIG. 3 shows, in perspective, a tube which will contain the sample of blood to be analyzed, this tube being made as described in the invention.

FIG. 4 shows an enlargement of a fragment of the crown of the turntable which will hold, in a given order, all the tubes of samples.

FIG. 5 is a vertical view along line V—V of FIG. 4.

FIG. 6 shows, in perspective, a fragment of the turntable holding the tubes of samples.

FIG. 7 is a cross section of a turntable with cups set out in groups, each having the number of cups corresponding to the estimated number of reactions for the analysis of the blood taken from a sample tube.

FIGS. 8 and 9 are sections along lines VIII—VIII and IX—Ix of FIG. 7 respectively.

FIG. 10 is a cross section, magnified, showing how the grooves are used to introduce into each of the cups of a section blood and reagents.

FIG. 11 is a vertical section along line XI—XI of FIG. 10.

FIGS. 12a, 12b and 12c are vertical sections showing various ways of placing the cups.

FIG. 13 shows, sectionally, the device used in the device FIG. 2 to distribute into each of the cups of a section of the turntable blood taken from a tube containing a sample.

FIG. 14 is a vertical section along line XIV—XIV of fig. 13.

FIG. 15 shows, magnified and in cross section, a detail of the device to control the angular movements of a turntable to feed the cups, sector by sector.

FIG. 16 is a schematic view in perspective showing probes in position to take a sampling.

FIG. 17 shows the same probes ready to feed the above mentioned grooves.

FIG. 18 shows, diagrammatically, a device ensuring the transfer, one after the other, of each of the discs to bring them in turn to the various positions: centrifuge, agitator and photometric reading unit; to make it easier to interpret this figure, the turntables holding the discs in each position are not shown.

FIG. 19 is a vertical section of the device shown in FIG. 18 with cross sections.

FIGS. 20 to 23 are horizontal sections of a cup, showing reactions at various phases of the mechanical treatment of a sample contained in a cup.

FIGS. 24 to 27 are vertical sections corresponding to FIGS. 20 to 23 respectively.

FIG. 28 shows, in perspective, a preferential alternative off the device of FIG. 2.

FIG. 29 is a drawing showing the operation of the device of fig. 28.

FIG. 30 is a vertical section of an optical element used with one of the cups in a sector of a disc during the reading of the characteristics of the reaction of the sample contained in the said cup, this optical element being for use in nephelometric measurements on the peripheral zone of the reaction.

FIG. 31 is a vertical section of an optical element suitable for use in opacimetric measurements either in the central counterfoils or in the peripheral zone of the reaction.

FIG. 32 is a cross section showing part of a sealing sheet used in the element represented on FIG. 31 (or FIG. 30) making it possible to work in one or other of the reaction zones.

Figure 33:
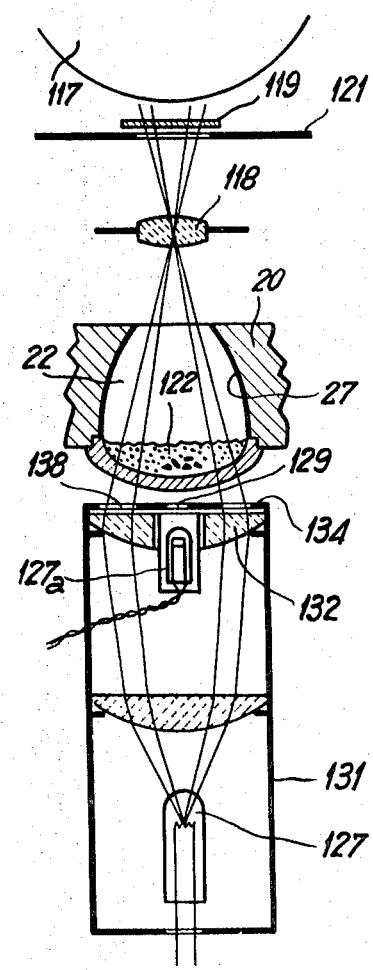
FIG. 33 shows an alternative for the photometric reader.

The equipment in general described in these figures is such that it becomes practically impossible to make any error of interpretation of results on analyses. Before printing or punching onto cards or tape the group of results for a given subject, a write-out unit attached to the equipment must compare with the greatest safety possible with automation, all the numbers of the various identification documents (counterfoils and cards) and 'note' that they are identical.

For this reason, full benefits can be derived from this system as a whole only by using sample tubes 6 forming an integral part of a special kit as shown in FIG. 1.

Sampling methods can be varied:

for example: using needles and nozzles, glass bottle, glass tube or: plastics material bag 1 — single or double — with nozzle and needle 5.

Such a device has been shown FIG. 1 to which has been added, to increase the safety factor, an integral system with sample tube 6, cards and counterfoils with identification numbers preprinted and preperforated in the factory.

Tube 6 is connected to vessel 1 by a kind of "mechanographical card" strip with removable sections 8, 9 and 10 each having the same identification number (preprinted and preperforated in the factory).

Part 8 adheres to container 1, part 9 adheres to tube 6 and part 10 can be taken off and filed.

It will be seen later that this detachable part 10 can be used in a print out and electronic unit which can be added advantageously to the equipment to be described in order to carry out various automatic control operations.

After being filled tube 6 is separated from container 1 to which part 8 remains attached. This tube together with part 10 is sent to the laboratory for analysis and this can be some considerable distance away.

On their arrival in the laboratory the various tubes of samples 6 to be analyzed are sorted and classified according to certain imperatives. Each tube is sorted and classified manually then placed on a circular stand 11 (FIG. 2) when part 10 is removed. These parts of the labels 10 are classified in consecutive order in the same way as the tubes are placed on stand 11.

To facilitate things, stand 11 has around its edge a circular ridge 12 (FIGS. 4 to 6) from which extend at regular intervals lugs or pillars 13 at right angles to said stand and such that they provide two resting surfaces 14 at the top.

Each tube 6 is of plastic injected material and moulded so that it has a vertical extension or tongue (FIGS. 3 and b) cut out as at 15a and integral with tube 6 at the top, as shown in 15b. This tongue 15 extends parallel to the tube 6 at a distance from it equal to the thickness of pillars 13.

It is on this tongue 15 that card 9 referred to earlier is attached with clips.

To fix on stand 11 each of the tubes 6 made in this way, tube 6 and tongue 15 are clamped "astride" two adjoining pillars of stand 11 and pushed down until the lower part 15b comes to rest against the sides 14 of the pillars.

When right down, the lower part of tongue 15 is inserted in a groove 16 molded in a ridge 12 in front of pillars 13.

By this method of linking tubes 6 and stand 11 when in position, all tubes 6 will necessarily be of the same height.

The same applies to the various information on each of the labels 9 associated with each of the tubes 6, each of which is on the same plane as the corresponding label on the other tubes.

Stand 11 is completed by a means to ensure its rotation step by step, that is to produce successive angular displacements corresponding to the distance between axes of two successive tubes. This can be realized by a ratchet device controlled by a magnet feed intermittently at a regular rate; or it can be realized by a motor 17 (FIG. 2) of the "step by step" type having a pinion 18 connected with a crown gear 19 integral with plate 11.

To determine the blood group, the blood sample contained in each of the tubes 6 — each tube corresponding to an individual — must be submitted to a series of reactions the number of which can vary according to the number of features required.

For this, from each of the tubes 6 a quantity of blood sufficient to be distributed among a group of cups each containing a special reagent (serum or test cells) must be removed.

In the apparatus according to the invention, the number of cups is 12 for each tube 6, ensuring an hourly output of grouping suitable for a very large specialized laboratory.

These cups are grouped on a stand having the shape of a disc being (FIG. 2), this disc being divided into 16 sectors 21 in each of which is fitted a group of 12 cups 22 corresponding to one tube 6. Thus, these cups are set in various groups on the discs, so that each group contains a number of cups 12 in the example chosen) equal to the number of reactions to be carried out on a given substance to be analyzed, all the cups of a group being destined to receive the same substance and each group being replaceable by another by rotation groups to be analyzed of a given fraction of a turn of the disc round its center. This disc also hold, as indicated below, mixing vessels, grooves and shutters between these vessels and grooves.

Referring to FIG. 7, it can be seen that the 12 cups are distributed along two radial lines 23 and 24 five in one line 23 and seven in the other 24.

In each segment 21, there are two grooves 25 and 26 also radial; groove 25 starts from a cylindrical cavity 25a and ends with a wider part 25b placed near the edge of disc 20.

In the same way, groove 26 starts from a cavity 26a and ends at 26b. The cavities 25a and 26a of the grooves form two small cylindrical vessels by which each groove communicates through a vertical slit 0.03 inches (1 mm.) wide and 0.15 inches (4 mm.) long. Referring to FIGS. 10 and 11 showing such a groove 25 said slit can be seen at 25c. At the meeting of groove 25 and vessel 25a there is a housing 25d formed by a simple vertical hole "astride" the slit, into which a probe 41 can plunge to block, momentarily, slit 25c. The liquid is pushed by probe 41 towards the vessel during the blocking phase. The liquids are thus introduced in powerful jets following a descending and tangential direction (as shown by arrows of FIGS. 10 and 11) in a very compact vessel, mix rapidly and well. When the probe is withdrawn from its housing 25d it unblocks slit 25c and the homogeneous liquid mix contained in vessel 25a passes in a second into the groove.

The inside shape of each cup 22 is generally speaking that of the base of a retort used in laboratories or more accurately that of a "brandy glass."

The cups are, for example, made in two parts, the upper part 27 (FIG. 12a) being opaque and black in color and the lower part 28 being transparent and forming the bottom of the cup.

Sealing off between the two parts 27 and 28 must be assured without sticking (to prevent any risk of leaks and also the risk of asperities forming inside the cups, the inside surface having to be completely smooth) merely by the assembling of the lower part 28 which is of a hard substance such as transparent synthetic resin, for example, known by the name of "Plexiglas" (Registered Trademark ) with the upper part 27 which is of a softer substance, such as polyethylene for example, which material is preferably used to make disc 20.

FIGS. 12b and 12c show two alternative ways of making the cups where the lower part 28 is placed in a flange 29 with interpenetration of circular ribs from one of the parts in circular notches of the other.

The flanges 29 of each cup are thin and are only made to withstand the forces resulting from the increase of their diameter when the lower hard part 28 is pushed down. If these forces were transmitted to the mass of disc 20, they would bend this upwards by pressing all on the inner face of the disc without any compensating force on the upper face. If this occurred, means would have to be taken to remedy this, which would complicate the molding of the discs.

Experiments have shown that one way of obtaining very good results is to use cups having the following dimensions:—
max. internal diameter of the cup around 0.63 inches 16 mm. (admissible values between 12 and 20 mm.)
diameter of upper opening of cup approximately 8 mm.
height of cup approximately 20 mm.

The taking of cells and plasma contained in a sample tube 6, introducing them in each of the 12 cups set apart for this tube and the distribution in each of these 12 cups of test reagents (for example, test serums and test cells) is done for example by using pumps known as 'Hook and Tucker — Mark I and Mark II' and also as 'autodiluter'.

Each of these pumps has two automatic syringes, fitted with sluices and flexible tubing.

The first syringe is only used to suck in a small amount of the sample into a fine probe. The second, whose piston is coupled mechanically to that of the first syringe, serves:

1. to take into a small bottle a certain amount of liquid containing reagents, diluent and flush water;
2. to push back this intake of liquid into the probe which was used to take the sample.

The mass of liquid, therefore, coming from this probe, contains: the sample, the reagent and the diluent. The volume of these two last products is sufficient, under certain conditions, to rinse the probe internally. These pumps are particularly suitable for use in conjunction with the apparatus being described.

The disc on which the cups are to be loaded is upheld by a drum 30 (FIGS. 2, 13 and 14); it is placed under a platen 31 fixed to the frame of the machine. Two columns 32 integral with platen 31 serve as guides to a sheet 33 which can be moved vertically by means of a cam 34 wedged on an axis 35 driven by a motor 36. On sheet 33 is mounted on a pivot, at 37, an arm 38 having at one end a spindle 39 in contact with a cam 40 also wedged on axis 35 of motor 36. At the other end, arm 38 supports two thin probes 41 and 42 (see also FIGS. 16 and 17). These two probes will henceforth be called "primary probes."

Vertically mobile sheet 33 contains 12 thin probes divided into two groups 43 and 44 according to the distribution of the 12 cups 22 in one of the sectors 21 of disc 20 (see FIG. 8). These 12 probes will henceforth be called "secondary probes."

At the end opposite to the motor 36, shaft 35 is integral with a pinion 45 engaged with a pinion 46 integral with a cam 47 against which is maintained elastically an arm 48 rotating about 49 on the fixed platen 31 and bearing at its free end a retractable rack 50, the use of which will be indicated later.

Disc 20 during loading is placed in the drum 30 in such a way that one of its sectors 21, for example sector N, is under the mobile sheet 33 in a position suitable for groove 25 of this sector to be beneath probes 43, whereas groove 26 is beneath probes 44.

In FIGS. 13, arm 38 is represented in a position where the two primary probes 41 and 42 are placed over the opening of a sample tube, for example tube 6a. The profile of cam 40 (against which rests spindle 39 held by arm 38) is such that, for one turn of the cam, arm 38 moves as shown in 51 of FIG. 13 and carries out a return movement with a stop at each end of the said path.

The first movement of arm 38 brings the primary probes in position above tube 6a in such a way that probe 41 and the entry 25a of groove 25 of sector $N_1$, preceding sector N in direction F, are equidistant from pivot 37 whereas probe 42 and to entry 26a of groove 26 (FIG. 17) are also equidistant from pivot 37.

The return movement brings the probes back to their original position.

The working of this device is as follows:

Sheet 33 is, at the beginning of the cycle, in a high position as shown in 33a of FIG. 14.

At the beginning of the rotation, cam 34 causes sheet 33 to be lowered and, therefore, primary probes 41 and 42 enter into the sample tube 6.

Probe 42 used for taking a sample of the plasma floating over the residue of cells in tube 6 can slide in a stand 152. Probe 41 is fixed on arm 38.

When sheet 33 is lowered the horizontal part 153 of probe 42 comes against the fixed stop 154. Thus prove 42 is immobilized in a well defined vertical position in relation to tube 6.

Probe 41 continues its movement of descent and at the end of the run of sheet 33 the openings of the probes are at different levels as shown in FIG. 16, these levels being adjustable. Thus, probe 41 plunges into mass M of the settled cells at the bottom of tube 6, whereas probe 42 plunges into the plasma P floating on top of the mass of the said cells.

With the lowering of sheet 33, the secondary probes 43 plunge into groove 25 of the above mentioned sector N and probes 44 plunge into groove 26 of the said sector.

The pumps are set in motion and produce, on the one hand, the taking up by suction of a given volume of cells into probe 41, of plasma into probe 42 and, on the other hand, the suction of a suspension of cells from groove 25 and of plasma more or less diluted as described above from groove 26, these grooves of sector N having been filled through a previous operation during which time taking of blood by the primary probes 41 and 42 had been made from tube 6b preceding tube 6a (FIG. 14).

After suction of the intakes, sheet 33 begins its rise to return to position 33a. During this rise probe 42 is brought to the same level as probe 41 through the action of spring 155 (FIGS. 16 and 17). At the same time, through action of arm 48, the rack of which 50 rests against a spigot 52 of drum 30, disc 20 is displaced angularly in the direction F (FIG. 13).

Turntable 11 carrying the sample tubes 6 is also moved angularly in direction F either by means of its own mechanism (motor 17) or by means of a direct mechanical link with drum 30, for example a crown gear.

During the early part of the rotation of drum 30 and turntable 11, the edge of the opening of tube 6a and the edges of grooves 25 and 26 rub delicately on the lower ends of probes 41, 42 and 43, 44 respectively before these probes are too high up, in order to remove any droplets which might occur.

Arm 38 is then driven to carry out the movement 51 bringing thus primary probes 41 and 42 above openings 25a and 26a respectively of grooves 25 and 26 of sector $N_1$ preceding sector N (FIG. 13). Towards the end of run 51 an adjustable screw 156 fixed on probe 42 comes into contact with a fixed stop 157 producing an angular movement of probe 42 in opposition to the effect of release exercised by spring 155.

The two probes 41 and 42 are separated one from the other and their ends are then placed perpendicularly to openings 25a, 26a of grooves 25 and 26 respectively (FIG. 17), or more exactly over the housings as shown in 25d for groove 25 (FIGS. 10 and 11). The angular movement of drum 30 and therefore of disc 20 is then stopped.

Sheet 33 goes downwards again, so that probes 41 and 42 plunge into the openings 25a, 26a of the grooves 25 and 26 of sector $N_1$ and probes 43 and 44 plunge into the 12 cups 22 distributed in sector N of the disc.

The pumps then come into action to push out, the contents of probes 41, 42 in grooves of sector $N_1$ and of probes 43 and 44 into the cups of sector N.

Then sheet 33 comes up and drum 30 resumes its movement which ends when sector $N_1$ has come into the position previously occupied by sector N. During this rotation, probes 41, 42 are brushed by the edges of the grooves and probes 43, 44 by the edges of the cups.

After drum 30 comes to a standstill, arm 38 is brought back to its original position and probes 41 and 42 are then displayed over a new sample tube, such as tube 6c, which has been brought into the position previously occupied by tube 6a.

After 16 cycles similar to the one just described, the one disc is completely loaded, drum 30 having made a complete turn.

During loading disc 20 is resting on five similar discs, 20a, 20b, 20c, 20d and 20e (FIG. 14) already loaded and stacked in drum 30.

The stacking of the discs is maintained in the drum by means of sliding thrust blocks 53, diametrically opposed each having a mass of soft iron which, when the drum has made a complete turn (that is when the loading of disc 20 is completed) are set facing magnets 54. When the latter are energized they attract the thrust blocks 53 and these, on sliding, free the lower disc 20a of the stack, a device of the type known as "delivery" holding the disc placed above 20b when this one has fallen by gravity and replaced disc 20a — and this continues until thrust blocks 53 freed from the action of the magnets 54 are brought by elastically back to their place inside drum 30.

A new disc is put manually into the loading position replacing disc 20 which has now taken the place of disc 20e.

The time required for a disc to go from loading position (disc 20 of FIG. 14) to clearance position for removal from the drum (disc 20a ) is determined in such a way that during this time the action of certain reagents can take place in the cups of the discs.

Disc 20a, freed by thrust blocks 53, falls on to turntable 55 (FIG. 14, 18 and 19) having a central stud 56 with conical end and fitted with a radial spigot with 'leanto' ridge 57 which fits into a radial rib 58 of each of the discs 20 (FIGS. 7 and 8), which ensures that disc 20 on the turntable 55 remains in a well-defined angular position so that each stage follows in the order of loading of each of the sectors, these, as has been said, corresponding to a sample tube 6 specified and classified in order on turntable 11.

Turntable 55 is connected through its shaft 58 to a motor 59, which is hung vertically at three points 60 to a frame 61, these three connecting points being formed by flexible elements such as rubber so that suspension is not rigid. Because motor 59 is very heavy, the whole assembly of motor car turntable has a low center of gravity and the system as a whole has a very different period of oscillation than that of the stable regime of the motor revolving at, say, 1,000 r.p.m.

This unit forms a centrifuge. Each of the discs coming in turn on to turntable 55 is spun for 2 minutes of which 1 minute is at 1,000 r.p.m.; a link brake 62 driven by a magnet 63 (FIGS. 18 and 19) stops the centrifuge within 5 to 6 seconds and then a vertically movable stop 64 is raised to lie in the path traced out by a spigot 65 integral with turntable 55 (FIGS. 14 and 19). A long impulse is then sent to motor 59 to make turntable 55 revolving slowly and then stop in the position defined by the meeting of spigot 65 and stop 64.

In this specific position, sector N which was loaded first on the disc just spun will be first to pass to a machine for reading reactions as shown later, as the disc cannot turn around its axis before this has been done.

This positioning is accurately adjusted by moving angularly spigot 57 in relation to turntable 55, that is to say by turning the central stud in relation to the turntable and by then blocking the stud on the turntable by means of a nut 66 which screws on to shaft 58 of motor 59 (FIG. 19).

As each disc is positioned on turntable 55 of the centrifugal unit the contents of each cup (0.5 ml. of liquid max.) present themselves as shown in FIGS. 20 to 24, the cells in suspension in the liquid being regularly dispersed within it.

During the spinning, the liquid 67 is pressed in the peripheral side swelling of each cup and the particles with sufficient density form a clot as shown at 68 FIGS. 21 and 25.

This spinning is to facilitate as far as possible the possible agglutination of cells by molecular links, reducing, (by compression) the intercellular space as much as possible.

During the spinning, the liquid in excess remaining in grooves 25 and 26 is retained in these by a flange 69 set around the disc (FIGS. 7, 8 and 14), unless this excess liquid is sucked up by a special pump.

The centrifugal unit is placed in the middle of a mobile frame having the general shape of the letter H, that is with two parallel frames 70 joined by a cross section 71.

Each of these frames holds an endless chain 72 mounted on wheels 73 placed at the ends of the frame. Each of these chains is connected to a wheel 74. The two wheels 74 are set on a single shaft 75 driven by a motor 76, wheel, shaft and motor being supported by clamps 77 integral with each of the frames 70.

The motor 76 can rotate in both directions and is of the brake-motor type.

Rollers 78 ensure a good contact between chains 72 and driving wheels 74 and rollers 78a can be fitted to support the upper strand of the chain.

Cross section 71 joining the two frames 70 is integral with a threaded vertical column 79 set in a nut 80 maintained vertical between two cross sections 81 integral with the fixed frame of the apparatus, which will be called the transfer gear.

Nut 80 is integral with a wheel 82 connected to an endless screw 83 driven by a motor 84.

Thus, when said motor is started screw 79 moves up or down according to the rotation of the motor. Therefore the mobile frame 70–71 is moved vertically in one direction or the other; the guiding columns 85 (not shown in FIG. 19) are placed to counteract the horizontal rotation of the said frame which might result from the screwing movement.

The separation of the two chains 72 is determined so that two diametrically opposed segments of the disc resting on turntable 55 are perpendicular to the chains as shown in FIG. 18.

Therefore by inducing, through the starting up of motor 84, the rise of the mobile frame 70–71, the chains 72 of this frame come up to disc 20a (FIGS. 18 and 19) and drive it by their movement freeing it from the central stud 56 of turntable 55.

When motor 76 is started this drives chains 72 in direction $f_1$ for the time required for the disc to come over a turntable 86 placed beyond turntable 55 in the center plane of the frame of the transfer gear.

The motor 76 is then stopped while motor 84 starts and turns so as to bring down frames 70 and therefore chains 72. The disc transferred over turntable 86 comes to rest on it centering on the central stud 87 with radial spigot 88 which, by entering into notch 58 of the disc, ensures that the disc is retained in the same angular position as that which it occupied on turntable 55.

Shaft 89 integral with turntable 86 is fixed to a sheet 90 (FIGS. 18 and 19) connected by four spindles 91 to four small crankdiscs 92 with vertical shafts set on the fixed frame of the machine.

Shaft 93 of one of these crankdiscs is integral with a pulley 94 and shaft 95 of another crankdisc is integral with another pulley 96. Pulleys 94 and 96 are facing each other, pulley 94 has a diameter approximately three times that of pulley 96, Between the two pulleys is placed the end of shaft 97 of a motor 98 supported on a cradle 99 pivoting in 99a on the frame of the machine, this cradle being extended beyond its pivot 99a and having at one end a screw 100 in contact with a cam 101. Being mounted with a pivot on the prongs of cradle 99, motor 98 is maintained by its own weight in position as shown FIG. 19, the end of the shaft resting against the edge of pulley 94. In this position motor 98 rests on one end of a lever 102 pivoting at 103 on the fixed frame of the machine. The other end of lever 102 rests on the core of a solenoid 104 fixed to the frame.

When the solenoid 104 is energized, its core moves lever 102 to bring motor 98 into a position where the end of shaft 97, now in position 97a, is in contact with the small pulley 96 (FIG. 19).

Shaft 97 resting on one end against one or other of pulleys 94 or 96, motor 98, when started up, drives by rotation the crankdisc 92 integral with the said pulley.

Sheet 90 transmits this rotating movement to the three other crankdiscs and makes circular movement of a radius equal to the distance between each spindle 91 and the rotation axis of the corresponding crankdisc and this without the causing the sheet to turn on itself. Turntable 96 connected to this sheet naturally has the same circular movement at a slow speed (about 40 to 80 r.p.m. according to the speed of the engine) when shaft 97 is in contact with pulley 94 and at a high speed (about 120 to 200 r.p.m.) when shaft 97 is in contact with pulley 96.

For a given speed of motor 98 it is possible to vary slightly, by increasing, the speed of pulley 94 that is slow speed of turntable 86.

Cam 101 is made to turn so that cradle 99 produces a slight rise of motor 98 so that contact between shaft 97 and pulley 94 does not occur at the end 105 with the small diameter of the said shaft but on the conical part 106 (FIG. 19). By regulating screw 100 the point of contact along the generatrix of cone 106 can be adjusted very exactly and the speed required obtained with maximum precision, which is very important for the quality of the further examinations of the reactions.

The rapid movement (pulley 96 driving) stirs up the liquid mass, contained in each of the cups 22, imparting a circular movement in the same direction as that of the rotation of turntable 86 of the agitator device. This liquid covers the deposit of cells settled on the side of each cup (as shown in 68 on FIGS. 21 and 25) and brings back into suspension both the cells still free (not agglutinated) and the cells agglutinated in particles of various sizes as shown in 107 FIGS. 22 and 26.

The slow movement (pulley 94 driven by end 105) induces — by a complex mechanism — the gathering in the central zone of each cup of all agglutinated particles, that is having a greater mass than that of a free cell. Thus, at the end of the slow movement, the agglutinated material is placed in the central zone of each cup as shown in 108 FIGS. 23 and 27 and there only remains in the peripheral annular zone 109 free, nonagglutinated cells.

Agitating at a given speed obtained by adjusting screw 100 (pulley 94 driven by the conical part 106) enables a true collection of microagglutinates to be made which is very important as specified above.

When the stirring up stage is ended motor 84 is started so that the mobile frame 70–71 rises as well as the disc by means of chains 72 as said earlier.

With the start of this upward movement the armature of microswitch 110 (FIG. 19), placed on the mobile frame, comes against sheet 90 of the agitation device and cuts the feed of the motor 98 at the precise moment when the central stud 87 of turntable 86 is passing through the point of its trajectory furthest from the central stud 56 of turntable 55 of the centrifuge.

Turntable 86 being thus immobilized, chains 72 raise the disc set on the said turntable and then bring this disc over the third turntable 111 which follows turntable 86 (FIGS. 18 and 19).

Turntable 111 is set on a pivot 112 integral with the fixed frame of the machine; this table also has a central stud 113 with radial rib 114. This radial rib 114 is mobile in the vertical plane so that it can close an electric circuit when nothing rests on it, which occurs when the disc is correctly positioned. The apparatus cannot begin reading a disc unless the said electric circuit is complete.

The disc deposited on the turntable by the lowering of the mobile frame 70–71 interlocks with this stud and is them immobilized on the table in the same angular position as it occupied on the previous turntables 55 and 86, that is to say that the sector loaded first by the contents of an identified sample tube will be the first to be subjected to examination of the reactions.

FIG. 28 shows an alternative loading device which has the following advantages over the former, described one:

simplification of the construction of discs carrying the cups, since the mixing reservoirs, grooves and sluices connecting these vessels and grooves can be dispensed with;

rinsing of the ducts can be carried out very efficiently and at length if desired;

completely doing away with the need to dismantle the pumps to clean them if they had dispense products subject to degradation limited period of conservation;

greater economy of reagents.

In the layout shown FIG. 28, one can see, as in the device shown in FIG. 2, the centrifuge 55, the stirrer 86, the reading table 111, the transfer device with chains 72 and drum 30 on which turntable 20 is placed. Turntable 11 on which tubes 6 were placed is done away with. As mentioned above, one of the safety principles of the device according to the invention is to read (by means of reader 148 as described below) and to set down the identification number of each sample tube only when the cups corresponding to this tube are about to pass under the photometer 115 for measuring reactions. It can, however, take up to 20 minutes between the time when a sample is taken from a tube to be poured into a cup on the turntable to the moment of reading this number. This therefore requires the presence of a large number of samples between the position for taking the sample and the position to read the cards. Turntable 11 must thus be very large to accommodate a great many samples.

The setup shown in FIG. 28 obviates difficulty. To this end, the sample tubes in which the blood to be analyzed has been placed are introduced into parallelipipedic loaders 200 which can move, by propulsion means not visible on the figure, in two orthogonal directions on a sorting-table 201 of the apparatus. These movement make it possible to bring the loaders and tubes they contain to various positions where various operations are carried out, as described further on.

As has already said, reactions cover both erythrocytes and plasma or the serum of the blood to be analyzed. However as it would be difficult to distribute directly and accurately the globular deposit (highly concentrated) in the vessels or cups, it is necessary to prepare a diluted suspension. For this, each sample tube 6 is integral with another tube 6a called 'auxiliary tube' which will be explained later on. 6a As soon as the blood has been taken from a patient, the sample tube is filled, the auxiliary tube remaining empty. Then the unit formed by these two tubes and their identification tag is placed in one of the loaders 200 which can, for example, hold 16 of these units placed side by side.

When a loader 200 is full, it is placed on the table 201, through a passage or chute 202, where it is made to advance step by step by means not shown to bring the first sample tube of the said loader under probe 203 of another pump 204. Probe 203 is flexible and goes through a mobile sheet 205 (for example by means of cams not represented) able to move it. When the first sample tube 6 is in position probe 203 plunges into the deposit of erythrocytes formed by sedimentation or centrifugation, sucks up a given and adjustable volume of this deposit and rises, rubbing against the inner edge of tube 6. Then probe 203 moves sideways until it is over the associated auxiliary tube 6a, into which it descends and ejects completely the sample or erythrocytes taken together with a few milliliters of physiological saline solution which rinses out efficiently the inside of probe 203 as well as the outside, the probe then plunging into the liquid it has just ejected. To this physiologic solution can then be incorporated sensitizing ingredients, such as dextran, bromelin, etc. Probe 203 then rises rubbing against the inner edge of the auxiliary tube 6a and returns to its original position. In this way there is prepared in the auxiliary tube 6a a globular suspension suitable to obtain later a good photometric precision and a good sensitivity.

Loader 200 then comes forward one step to bring the next tube 6 under probe 203 and the same process repeats.

When the sixteen auxiliary tubes of the loader have been filled as said, the loader is moved so as to bring each tube 6 and tube 6a associated under probes 206 and 207 respectively of a peristaltic multiple pump 208 after a sufficient time lag (say 8 minutes) for the ingredients to have acted on the erythrocytes contained in the auxiliary tube 6a.

The peristaltic pump 208 can be of any known make and its outputs are connected to those of another peristaltic pump 209 to form mobile probes with outlets 210 (see FIG. 29) the suction probes 211 of this pump plunging into containers holding reagents 212 set in casing 212a (see FIG. 28)

Of course the number of outlets of pump 209 is equal to the number of reagents used and linkage between outlets of pumps 208 and 209 is obtained to be able to add the appropriate reagents to the sample in tube 6 or to the cell suspension in tube 6a.

Thus on FIG. 29 (where only four outlets to pump 209 instead of the 12 on FIG. 28 have been shown to make the representation clearer) probes 206 and 207 are respectively connected each to two reagent vessels through pumps 208 and 209.

Probes 210 are formed by flexible ducts going through a mobile sheet 213 (for example using cams not represented here) adapted to move them and bring them either into a fixed trough 214 or into cups 22 of a disc 20.

Probes 206 and 207 being respectively plunged into the sample contained in tube 6 and into the cell suspension contained in auxiliary tube 6a, pump 208 starts moving (in the direction of arrow F208) then stops when the taken sample begin to run into the evacuation trough 214, probes 210 being then in it. These probes 210 rise rubbing against the edge of the trough 214 and move along to plunge into a group of cups 22 on turntable 20 while probes 206 and 207 come out of tubes 6 and 6a to plunge and remain in a tank 215 containing renewed physiologial saline solution. Pump 208 continues again and lets out into cups 22 either blood sample from tube 6 or the cell suspension from tube 6a. At the same time, pump 209 starts (in the direction of arrow F) and distributes the reagents into cups 22. Then pumps 208 and 209 stop, probes 210 rise rubbing against the edge of the cups into which they were plunged and return to their original position in trough 214. Pump 208 starts up again, rinsing the pipes associated to it with physiologial saline solution from probes 206, 207 to probes 210. The flush water is evacuated into a trough 214. After rinsing, pump 208 stops, then probes 206 and 207 come out of tank 215 rubbing against the edges of it and are placed over the tubes 6 and 6a which follow. A new cycle is about to begin.

While probes 210 go from one group of cups just loaded to trough 214, disc 20 turns to replace that group with a new group of empty cups just loaded.

The various movements just described are carried out automatically by means of mechanisms not shown as they are self-evident to the specialist. The cycle of movements of probe 203 and that of the working of pump 204 are synchronized with the cycles of probes 206 and 207, and 210 and pumps 208 and 209, to take the same time as the displacement of loaders 200.

After these operations, the loaders advance step by step in two orthogonal directions towards an evacuation chute 216 of table 201.

The identification reader 148 — referred to later — is situated here. Preferably systems of cams controlling the advance of loaders and discs 20 (following a path similar to that described earlier in respect of the first embodiment) are coupled so that the identification number of a pair of tubes 6–6a is read (by 148) and transcribed when disc 20 containing the corresponding reactions reached the reaction reader 115.

Whether the loading device of the cups is that shown FIG. 2 or that shown in FIG. 28, the first sector of the disc resting on turntable 111 is situated at a "reading area" where it is immobilized.

The reading area is situated between two casings, the upper one shown diagrammatically at 115 on FIGS. 2 and 28, the lower one, also shown diagrammatically, 116 on FIGS. 2 and 19.

A claw mechanism, similar to that of some cinematographic projectors and not represented in the drawings, allows the disc to advance directly step by step and to remain for the time needed to carry out a reading. To bring in turn each of the sectors of the disc into position on the reading area, the disc has notches set up in the mold and corresponding exactly to the position of the cups.

This step by step advancing movement of the disc is determined with an exactitude of ±0.02 inches (0.5 mm.) so that each cup is brought into a coaxial position with the corresponding optical device.

When nephelometric means are used to analyze the contents of the cups, the upper casing 115 contains a projector with an iodine bulb (of 600 W) shown diagrammatically at 117 FIG. 30, a condenser, and 12 lenses 118 distributed according to the lay out of the cups 22 in a sector of disc 20, each lens corresponding to a cup.

Each of these lenses receives light from the bulb 117 through ground glass 119 and each lens forms the image of aperture 120 formed in a stop 121 over the whole surface 122 of each of the reaction mixtures, without lighting directly the inner surface of the upper part 27 of each cup and, moreover, without the beam being intercepted by the upper edge of the cup.

As already said the upper part 27 of the cups can be polyethylene or black polystyrene to form a "black background."

Below turntable 111 which has apertures corresponding to each of the cups in each of the 16 sectors there is located, inside casing 116, a movable sheet 123 having 12 annular openings 124 (one per cup).

Under each of these annular openings 124 is placed a tube 125 containing two lenses 126 giving an image of opening 124 on a photoresistive cell 127.

Screens 128 placed to eliminate the parasitic light sent back by the inner wall of the tube are situated along tube 125.

The top of tubes 125 have an annular opening 129 corresponding to opening 124 of sheet 123 and also a central opening 130, the use of which will be shown later.

If opacimetric measurements are used to analyze the contents of the cups the tubes in the lower casing 116 is different to that shown FIG. 30. In such a case (FIG. 31) tubes 131 containing the photoresistive cell 127 are fitted with two lenses 132, 133 as shown.

A mask 135 (replacing sheet 123 above mentioned) also has annular openings 136 (placed to correspond each to a cup) and also 12 holes 137 also set out in each sector (see FIG. 32).

Plate 135 can be moved at an angle in the horizontal plane under the action of a magnet not shown here. In one position the annular openings 136 cover annular openings 138 in the top of each tube 131 and in another position they close these openings 138 but, then, expose the holes 137 opposite the central openings 139 of the base 134.

In these conditions the machine makes readings which refer only to a small central zone of each reaction.

The size of the annular openings 136 and 138 are greater than those of the openings 124 and 129 respectively (FIG. 30) which is an advantage.

After the period of agitation, carried out on turntable 86 there only remains in a peripheral annular zone, shown as 109 in FIGS. 23 and 27 free non agglutinated cells which give to this peripheral liquid zone of the reaction a cloudiness which can be measured photometrically:

either by nephelometric means if a very small amount of reagent cells have been used or by opacimetric measurements if a fairly strong dose of cells has been used.

Nephelometry with peripheral reading can be carried out if the disc 20 is of a black, opaque substance and if a sheet 123 (FIG. 30) with annular openings 124 is used.

Opacimetry (or, if desired, a measure of peripheral transmission) can be carried out if the disc is either of a black substance, or transparent or translucent or opaline and a sheet 123 is used (FIG. 30).

Opacimetry with central reading can be carried out whatever the disc but with a sheet 135 using holes 137.

Opacimetry of the central zone of a reaction can be carried out with a device as shown FIG. 30. In such a case the central opening 130 is used.

The 12 cells 127 corresponding to the 12 cups of a sector of the disc are connected by a cable 140 to 24 conductors, to an electronic set up represented diagrammatically in FIG. 2 and including elements already known as of right and therefore not described in any detail. These elements are:

12 bridges used to equalize the characteristics of cells 127
a programmer-interrogator 141
a digital voltmeter 142
a system of threshold gates 143
a memory block 144
a comparer of coded signals (alpha-digital)
a printer control unit Each of the 12 cells is mounted in a bridge arm so that a zero adjustment and a sensitivity adjustment are possible. The cells are fed by a continuous regulated voltage applied permanently.

The programmer-interrogator 141 connects in turn (possible) out of phase balance voltage of the bridges to a digital voltmeter 142 having three decades. If desired, the numbers from all three decades may be taken into account; or from two decades only, or from one, and these values will then be compared to standard values to determine the characteristics of the reaction being examined.

The electronic device has the advantage of giving a means of using the printer units.

In such a case the information derived from the digital voltmeter 142 will be transmitted to the system of threshold gates 143.

As seen below, each measurement of the digital voltmeter 142 can be compared (for example with preselection counters) to two threshold levels, each adjusted by a 10-level numerical decade.

If the measurement by the voltmeter 142 is within the two levels of cutoffs, the printing on the printer 143 comes out in red. In all other cases it will be black.

Also a memory 144 with three positions is engaged according to the position of the measurement result compared with two threshold levels, namely:

measurement equal or greater than the lower level
measurement equal or greater than the upper level
measurement between these two levels.

Switching is done by the programmer-interrogator 141 through relays.

The apparatus has several programs plug-in or interchangeable, which can be started by means of a manual selector button or by an automatic selector controlled by a colored filter placed on a window set there for this purpose on the discs.

This filter with narrow transmission band passes over a group of cells each fitted with a narrow transmission band filter which is different for each cell; only the carrier cell of the filter of the same color as that of the filter situated on the disc will be energized and will start up the special corresponding program.

The results calculated from the measurements can be evaluated in three different ways:

absolute measurement of a cell
relative measurement of one cell compared with another cell taken as reference '0'
average between absolute measurements of several cells (generally six).

Figure 34:
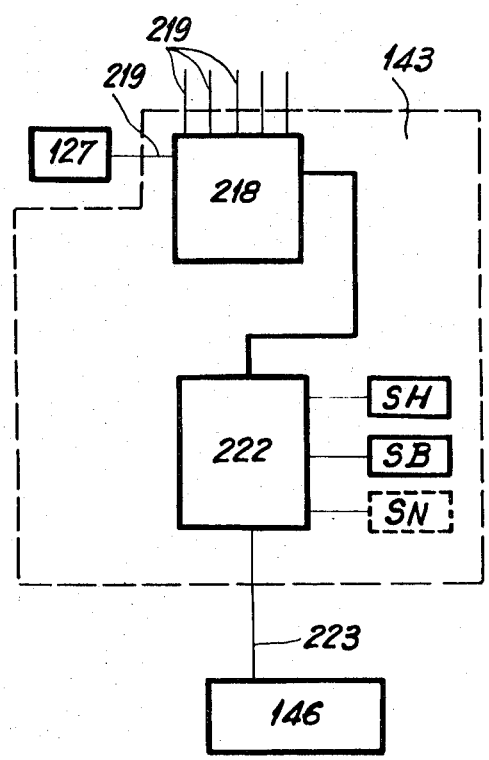
FIG. 34 is a synoptic diagram of the electronic measuring and interpreting device.

Each measurement will give rise to the printing of a quantitative result (by printer and possibly by a card punch 146 (FIG. 34)).

After a cycle of examination of 12 cells the memories corresponding to each of these 12 cells are in various "positions." To some of the possible combinations of these "positions" is made to correspond, on the printer, certain characters or sequence of characters.

Thus an automatic interpretation of the results is obtained.

This eliminates the risks, which are not negligible, of errors in logical deduction which might occur with an operator.

The relation between the various combinations of results and the characters is expressed by means of work programs (which may take the form, for example, of interchangeable plug-in program board).

This overall scheme is completed by collating unit which carries out automatic comparison of the identification numbers on all the counterfoils and cards referring to the same subject, so that the results of the grouping for a given person cannot be printed on any documents which does not concern him or her, even if tubes or cards have been muddled up.

The automatic comparison of results obtained by "peripheral reading" (as said) of reactions on the one hand, then by central reading on the other, enables any defect occurring at any point in the chain of operations carried out to be detected (faulty working of pumps, accidental emptying of a cup, etc.).

This unit includes (FIGS. 1 and 2)

a reader 147 of punched information on counterfoils 8 of containers 1
a reader 148 of punched information on counterfoils 9 stuck on sample tubes 6
a reader 149 of cards 10
a printer-punch 146
a list printer 145
a marker 150 to print results of groups: group ABO, rhesus, etc. directly on the counterfoil of the container or bottle of blood.

Mechanographical controls ensure maximum safety during the various transcriptions (number of sample, name of patient, results, etc.) and require, for each patient, the use of a set of three cards.

In this case, part 10 (FIG. 1) is formed by two parts $C_1$ and $C_2$: these are detachable and each is in the form of a mechanically handleable card. They bear a number which is the same as shown on part 9 stuck to the sample tube 6 and on part 8 on container 1.

1. At the time of taking the blood sample, the NAME, forename, No. of donor and various information (address, antecedents) are set down on card $C_1$.

2. In the laboratory, during classification, that is after having placed tube 6 on table 11 or in a loader 200, an operator punches the second card $C_2$ with the NAME, Forename and No. of the patient, as shown on $C_1$, but handwritten. A mechanographical check by means of a 'checking' keyboard guarantees the exactitude of this vital transcription.

3. Cards $C_2$ are placed in the card reader 149. The passage of a cog of one sector in the reaction result reader 116 sets off an impulse which starts up the card reader 149 and the reader of counterfoils 147. These two readers are passed into a comparator 151. If the numbers do not agree, operations will cease.

If they agree:

Reader 149 continues reading card $C_2$ and requests:

Printing of name and forename and No. of donor on a list and on a third card $C_3$ which is punched at the same time.

The identification number has been written down by the list printer and by the puncher during the reading and the machine stops at the slightest divergence. So numbers which did not agree would be incomplete and stop at the time of printing.

The reading of the last column concerning the identity of the patient generates a starting impulse of the interrogator 141 of the cells. Quantitative and qualitative results are passed to the list printer 145 whereas puncher 146 only receives, generally, qualitative results.

The last column of the identity having been read and punched, reading of $C_2$ stops there.

Thus: the first card $C_1$ is for filing: it gives the information handwritten as described in (1) above, and various other information but not the results. These could however be set down during the passing through puncher 146 after card $C_3$ has been placed in reader 149). The second card $C_2$ aims at giving a detachable strip giving the identity and results (verified). Finally it will be stuck on the donor's card. The third card $C_3$ gives: identification number, name, forename, No. of donor and results, with or without any other information. It is also for filing to complete card $C_1$ and has the advantage that it will certainly be undamaged, not having been handled previously.

The cycle controlling the apparatus must take into account the fact that when seeking to establish a group A.B.O.Rh, there must be some time lag before centrifugation of the reaction mixtures and it is for this reason that drum 30 is used, where five discs can be placed at the same time.

So between loading of a group of cups on a disc 20 (FIG. 2) and reading this group in units 115 and 116 of cups there is a phase displacement of a certain number $n$ of groups of cups.

When a group of cups comes before probes 43 and 44, reader 148 of the counterfoils of the sample tubes must be positioned $n$ tubes 6 further on in direction F of the loading tube so that counterfoil 9 before reader 148 corresponds to the sector which is at that moment before reaction reader 116.

The general rhythm of the cycle is based on the duration of a sequence of operations which occur in a closed cycle.

1. The step by step controlling device of the reaction results reader 116 introduces a $n$th group into reader 115–116. It then emits a starting impulse applied simultaneously:

to interrogator 141 of cells 127
to readers 148 of counterfoils and of cards 149 (that is in fact the mechanism for the advance of tubes and cards)
to loading pumps.

2. Readings of numbers on counterfoils and cards are compared at 151 while the digital voltmeter 142, the threshold device 143 and the logic load the results as to the memory 144.

3. After this operation, comparator 151 allows or prevents memory 144 from ordering puncher 146 and list printer 145 giving out results 4. Once a card is completed, puncher 146 generates a starting impulse applied to the step-by-step control device 116 for reading reactions, thus bringing forward a new sector etc.

The list printer 145 is also controlled directly by the card reader 149 for all information which has been given previously to the results (numbers, names, forenames, etc.).

The reading of this part of the card will simply be a few seconds out of phase compared to the reading of the punched number allotted to comparator 151.

In some cases one can obtain, by reversing the direction of the transfer, a to-and-fro movement of a disc which is thus subjected to an automatic succession of centrifugation, agitation, centrifugation, agitation, etc. before being read.

A general programmer (not represented) makes it possible to vary the duration of each of the elementary operations of centrifugation, high speed agitation, exact low speed agitation, etc.

The photometric measurement device of reactions inside cups 22 shown in FIGS. 30 to 32 is able to carry out simultaneously, for all cups in a group set on disc 20, a series of photometric measurements in the peripheral zone of the contents of the cups and to have results of such measurements printed. For this, the reading device has a number of photoresistant cells equal to the number of cups of a group of cups, each cell being is set opposite the bottom of one of the cups.

Then, by passing again these same discs with cups to the measuring device, or by carrying out again the same reactions on the same samples, it is possible, by arranging for openings 137 and 139 of membrane 137 and bottom 134 of casing 131 (FIG. 31) to coincide, to measure the central zone of the reactions. Comparison by an electronic comparator of results of these measurements with those obtained previously enables any divergence between results to be detected and displayed automatically.

The photometric measurement device of reactions described in FIG. 33 makes it possible to carry out simultaneously for a single cup photometric measurements in central and peripheral zones of the medium it contains. For this (see FIG. 33) a second photoresistant cell 127a is placed facing opening 129 of bottom 134 of casing which forms a stop, mask 135 being dispensed with. Cell 127a can be placed in a central hole of lens 132 and it must be sufficiently small not to intercept light passing through the annular opening 138 and received by cell 127. This measuring device therefore has double the number of cells (24 in the example described) to that (12) of cups in a group.

The results of the two kinds of measurements corresponding to one cup 22 can therefore immediately be compared by means of electronic and mechanographical means known to the qualified person. In case of any divergence, these methods can, for example, ensure that a special sign is printed or punched by machine 146.

In this way, safety and speed of obtention of results verified by double checking are considerably increased.

Such a systematic and immediate verification of the results of measurements taken is important since the operations as a whole required by the type of analysis for which the device described in the invention is conceived, in particular for determining blood groups, is complex and since the consequences of any breakdown in the device can be much more serious than for any other type of analysis.

This verification shows up, amongst other things, with compete assurance, the following possible causes of error:
  sampling probes blocked
  Level of erythrocyte deposit not reached by the sampling probe in sample tube 6
  pumps not working
  insufficiency of reagents
  any deficiencies in a connecting pipe
  accidental emptying of a cup 22
  accidental spot or dirt in cup 22
  deficiency at any point of the photometric-electronic measurement devices provided this deficiency has an 'illogical' result.

Thus detection of faults resulting from one of these causes, through using a measurement in the central zone of the base of cups controlling measurement in the peripheral zone of the said base, is based on the following principles:

1. When there is a real and normal agglutination (that is existing in the central zone of a cup one has simultaneously compared with observations made on a test reaction without any agglutination:
  increased transparency in the peripheral zone of the reaction
  decrease of transparency in the central zone of the reaction.

These two phenomena are connected by a ratio of contrasting complementarity: if there are agglutinates and if they are all collected in the central zone, they cloud it and as these agglutinates are formed from particles withdrawn from the initial mass of particles (free cells) in suspension, the opacity of the latter in the peripheral zone is consequently decreased.

2. When one of the causes of error mentioned above occurs, variations of peripheral and central transparencies cease to be opposed: therefore peripheral and central transparencies vary in the same direction or one only of these two transparencies varies.

According to the incriminating cause, there can be:
either increase of transparency in the peripheral zone, or increase of transparency in the central zone.

(This is the case, for example, if one of the cups is accidentally upset, causing absence of corpuscles through pump deficiency.)
  or decrease of transparency in the peripheral zone
  or decrease of transparency in the central zone.

(This is the case, for example, when a transistor of the reading circuit in the peripheral zone fails to work although there is in fact agglutination in the central zone.)
  or again no alteration in the peripheral transparency
  decrease of central transparency.

This is the case, for example, when a spot or object cloud the bottom of a cup.

3. When there is absence of normal agglutination, there is:
  no variation in peripheral transparency
  no variation in central transparency.
and these transparencies are respectively equal to those of the test sample.

The electronic measuring and interpreting device is so arranged, as described below, that any two results (peripheral measurement and corresponding central measurement) which do not conform to one of the two possible normal answers:

Increase of luminous flux through peripheral zone
Decrease in luminous flux through central zone
} = Agglutination No variation of luminous flux through
Peripheral zone and central zone
} = Absence of agglutination causes a key to be depressed by mechanographical means 146 showing anomaly in the working.

It must be noted that these two simultaneous measurements in the peripheral and central zones do not constitute merely a repetition:
  they use different optical paths and electronic circuits
  they cover distinct reaction phases (one dispersed, the other collected) which are conceived through different mechanisms,
  finally, the treated samples which they test are not the same: transparent or cloudy liquids, on the one hand, agglutinates on the other.

For all these reasons, each of these measurements gives different elements of information, so that the control they exert one on the other give more checks than one would have had if one merely took the same measurement twice.

It has been said above that each measurement in the peripheral zone of a cup, given by voltmeter 142, was compared to a low and a high threshold.

It is not always acceptable to leave it to a machine to give a result automatically interpreted in all circumstances, when the nature of the phenomena measured often makes it a limit phenomena, requiring discussion.

This is the case for reactions of agglutination: often the agglutinates are barely detectable but nevertheless it exists and the characteristic "X" one seeks to detect by analysis and to attribute or not to an individual depend on it: it is a classification "all or nothing."

Some known machines, classify individuals into "X" or "not X", according to whether a measurement is greater or less than a single given threshold.

This process is very dangerous and is too rudimentary. Since:

if the threshold is regulated a little to high, very small agglutinations are not detected. The individual would be classified as being "not X" whereas in fact he would be "X";

if the threshold is regulated a little too low, measurements corresponding to a real absence of agglutination, by the very effect of their statistical dispersion, exceed this threshold which is too low and the individual is classified as being "X" whereas in fact he is "not X."

This danger is especially great for the detection of group $D^u$, in a blood analysis. One designates thus cells which are Rh+ with a very low reactivity so that they give agglutination only by using special techniques. In the known machines with automatic determination, one of these special techniques is in fact used on a special channel to detect Rh+.

Specialists know well the often very great difficulties found in asserting that some cells are $D^u$ rather than Rh−. If the electronic circuits for automatic interpretation only compare the measurement corresponding to a group $D_u$ to a single level of threshold, they obviously cannot classify it except as Rh− if this threshold is not reached, or as Rh+ if it is reached or exceeded. For a blood transfusion however, it is very important to distinguish between a Rh−, a very low $D^u$ and a normal Rh+.

This is why it is essential that each measurement be compared to two thresholds. It is then easy to adjust, by means of a test reaction, the level of the lower threshold, so that it differentiates, for example, between the Rh− and the $D^u$ erythrocytes, and the upper level so that it separates, for example $D^u$ erythrocytes from normal Rh+ ones.

Thus, in accordance with the invention, each measurement corresponding to a peripheral zone of reaction is compared with at least two thresholds, one low and one high.

The lower threshold is set slightly above the average level corresponding to a complete absence of agglutination, whereas the high threshold is set at a fairly high level, corresponding to the intensity of agglutination required to know whether the reactivity of the sample is absolutely normal, that the classification brooks no discussion and requires no further information.

In this way:

any measurement lower than the low threshold indicates an absence of agglutination. The result can be printed in black and in plain language by printer 146;

any measurement higher than the high threshold indicates normal intensity of agglutination, no further check being necessary.

The result can be printed in black and in plain language by printer 146;

any measurement between these two thresholds means: either, if the agglutination is relatively high, that the reactivity of the sample is sub normal, therefore requires discussion;

or, if the agglutination is very low, that it is wiser to start the analysis again with a more sensitive technique; or, if there is no real agglutination, that the lower threshold has been taken too near to the average level for "zero agglutination" and that breaking up of the measurements alone is responsible for this faulty answer.

To carry out these operations, the device 143 consists of a device 218 (see FIG. 34) to which are transmitted by lines 219, signals coming from each of the cells 127 and which is connected to a comparator 222 carrying out the comparison of each of these measurements with the high and low thresholds found, for each reaction, by devices SH and SB and which controls printer 146 through a line 223.

Thus, printer 146 can be controlled so that it does not give an answer in black and plain language should the measurement fall between the low threshold and the corresponding high one; the machine does not commit the error of classifying itself the sample; it befalls the user to think about the case and decide.

The printer might for example give quantitative results in red (to attract attention) and does not give qualitative results (that is in plain language) or gives them in red if the user wishes, or depresses a special key.

However, in order to reinforce yet further the reliability of the device in accordance with the invention, it is possible to compare each of the signals entering the comparator 222 with a third threshold called "negative" issued by a device SN where the level is lower than that corresponding to the total absence of agglutination.

Thus, the method of obtaining reactions which can be read by photometry and the photometric device for reading in accordance with the invention present peculiarities when the quantity of reactive particles (cells for example) used is excessive and when at the same time the dilution of the agglutinating substance is relatively low or very low: in such a case, it can happen that the reaction where there is agglutination (generally invisible to the naked eye) has a cloudiness in the peripheral zone greater than that in the peripheral zone of the control reaction mixture (without any agglutination), which at first sight seems paradoxical.

The explanation is: when conditions prevalent are such that one obtains the formation of numerous and particularly minute microagglutinates, it is sometimes impossible in a few minutes of special shaking up to cause them to gather in the central zone at the bottom of the cups where they could then be easily detected. These microagglutinates thus form a ring optically very slightly denser than the ambient medium, and which is more or less in the peripheral measurement zone. They make this more opaque than that of the control reaction.

To detect this agglutination, one is therefore obliged to compare the measurement from a peripheral zone to a threshold set slightly below the level of "total absence of agglutination" given by a control reaction (without any agglutination).

The circuits of interpretation 222 and 146 are then set up so that a measurement lower than this threshold controls the keystroke of a conventional sign, showing the existence of a very low agglutination for the corresponding reaction.

The advantage of this improvement is twofold:

1. it increases considerably the sensitivity of the machine, 2. it gives an extra element of safety, as there is no longer the risk of not noticing some slightly positive reactions when the user has wrongly adjusted his agglutinant system by selecting, for example, too strong a dose of reactive particles.

Thus, the device in accordance with the invention considered as showing absence of agglutination any measurement falling between the negative threshold and the corresponding low threshold.

Both are determined experimentally so that the statistical dispersal of the photometric measurements of the peripheral zone of reactions without agglutination gives only results between these levels of thresholds, chosen with a view to obtaining a certain, predetermined, coefficient of safety.

Obviously, any measurement lower than the negative threshold or higher than the low threshold show the existence of agglutination.

The complete model of the apparatus which has just been described forms a whole with a very high hourly output (6,000 elementary reactions an hour) endowed with improved and automatic means of detecting certain errors.

For many cases it is not necessary to have so many guarantees of safety, nor such a degree of automation.

The basic unit, used for all simplified versions, consists of a mechanical unit: a centrifuge/agitator. From this unit of "mechanical treatment" of reactions can be formed a complete range of models more and more complex and improved. Here is an example of a range of simplified machines with the special points of each model:

MODEL 1 consisting of: Centrifuge (turntable 55)
  Agitation device (turntable 86)
Giving reactions rapidly and with a very great sensitivity compared to those using classical techniques. The results are read "visually" (No quantitative measurement).
MODEL 2 consisting of: Centrifuge (turn table 55)
  Agitation device (turntable 86)
  Transfer means (chains 70)
  Reader of reactions reaction results (optical block 115 and photoelectric elements 116)
  Graphic recorder.
This model gives a good quantitative measurement being endowed with a recording and transferring method which is one of the essential elements to get precise results.
MODEL 3: Centrifuge (turntable 55)
  Agitation device (turntable 86)
  Transfer means (chains 70)
  Reader of reaction results 115
  Digital voltmeter 142
  Threshold device 143
  Memory and logic 144
  Printer control
  Printer 145
This model offers the same quantitative possibilities as model 2, but dispenses the operator with the effort of interpreting graphs, has an important output and expresses quantitative results more clearly in some ways.
MODELS 4 and 4bis:
  model 4 same as model 3 but having also:
  Tray or loader of sample tubes with special tubes with labels having preprinted, coded marks (or, model 4bis prepunched).
  Optical reader 148 of the said printed marks (or mechanical reader of the said punched holes for model 4bis)
Models 4 and 4bis make it possible to obtain, before the results are given on the same line, the number of the sample tube corresponding to these results.
This automatic transcription of the number is, in principle, safer than a manual transcription would be.
MODELS 5 and 5bis:
  Same as models 4 and 4bis, but having also:
  printing punch on tape or a recorder on magnetic tape
  a comparator of digital coded signals.
This makes it possible to carry out an automatic comparison (therefore quick, easy and safe) of results obtained by two (or more) identical series of determinations on the same samples, which considerably increases the safety of results.
MODEL 6
This is the "complete" model described herewith. The use of some models of card punchers makes it possible to use decimal figures, capital letters and lowercase letters and other signs,
  Also the cards make sorting operations easier and facilitate filing. Probably accuracy of reading is greater and their handling is often simpler for certain work.
In all models (1 to 6) loading of cups can be done either manually, or in a semiautomatic fashion, or automatically.
But for models 4 to 6 entirely automatic loading is more especially useful as it is the only one which makes it possible (through safety devices against accidental variations of position of the sectors referred to above) to take full advantage of an automatic reading of the counterfoil of the sample tubes.
Loading of cups can be done:
  automatically, as described
  manually, through glass pipes as is usually done in serology;
  semiautomatically, by dispensing with the following devices described above:
  special tray 11 for sample tubes
  devices 33 and 38 ensuring automatic displacement of probes 41 and 42 on the one hand, 43 and 44 on the other;
  drum 30 and its automatic release mechanism for the lowest disc.
On the other hand, the system of automatic pumps is retained and used as follows:

The operator takes manually one by one the sample tubes set on any tray. He plunges into them the twin probes 41 and 42 which are of different lengths. Through a foot operated switch, he controls the suction of cells and plasma. Probes 41 and 42 are carried on a shoe which corresponds in shape to a window cut in the transparent plastic hood covering the disc, which is placed immediately above the openings of grooves 25 and 26 to be loaded. The walls of the shoe and of the window are slanted so as to give self-centering to the shoe in the window when it is introduced into the said window. Then the probes are placed exactly above the openings of the grooves and the operator can control the outflow of liquid.

He repeats a similar maneuver between these grooves and the corresponding cups, using this time probes 43 and 44 fixed on a slat he rests on another window enabling twelve probes to be centered over their respective cups without any hesitation.

An angular movement mechanism, step by step, of the disc ensures that the sector comes up one by one. This mechanism is activated by a withdrawal movement of the slat out of the corresponding window.

Of course modifications can be brought to the method of execution described here, in particular by substituting equivalent technical methods, without going beyond the limitations of the present invention.

I claim as my invention:

1. A method of analyzing a liquid medium susceptible of forming, with at least one appropriate reagent, agglutinants, and in particular of analyzing blood groups, wherein the said liquid medium, together with said reagent, is subjected to at least two successive agitations in a transparent bottomed cup, the first being at a speed greater and the second at a speed lower than a critical speed above and below which macroagglutinants in the medium are dispersed in the medium, and collected near the center of the transparent bottom of the cup respectively, and wherein the opacity of the said medium at least through part of the area of the transparent bottom of the cup, is measured by turbidimetry approximately parallel to an axis normal to the said bottom near its center, this measurement by turbidimetry being carried out with reference to a test medium on which the same operations are carried out.

2. A method according to claim 1 wherein the base of the cup is concave.

3. A method according to claim 1 wherein, after the said first and second agitations, the liquid medium to be analyzed with the said reagent added is subjected to a third agitation at a speed lower than the said critical speed but nearer to it than that of the said second agitation.

4. Method according to claim 1 wherein, before the said first and second agitations, the liquid medium to be analyzed with the said reagent added is subjected to a centrifugation.

5. A method according to claim 1 wherein the measurement by turbidimetry through the transparent bottom of the cup is carried out in the central zone of the said bottom.

6. A method according to claim 1 wherein the measurement by turbidimetry through the transparent bottom of the cup is carried out in the peripheral zone of the said bottom.

7. A method for analyzing a liquid medium which with a suitable reagent yields a deposit such as a agglutinate or a precipitate comprising
  a. introducing into a reaction vessel a mixture of said medium and said reagent;
  b. subjecting said mixture to a first agitation at a speed higher than a critical speed above which the constituents of the deposit are dispersed in the medium;
  c. subjecting the resultant mixture to a second agitation at a speed less than the critical speed for gathering the deposit in the lower central portion of the said vessel; and
  d. determining the degree of deposit of the agglutination or precipitation by a photometric measurement of the mixture.

8. A method according to claim 7, for serological analysis and blood typing, wherein said liquid medium is a suspension of blood cells or a dilution of plasma.

9. A method according to claim 7, wherein said photometric measurement is a turbidimetric, opacimetric or nephelometric.

10. A method of claim 9, wherein said measurement is conducted substantially orthogonally to the bottom of the vessel, said bottom being transparent.

11. A method according to claim 7, wherein the photometric measurement comprises a comparative measurement relative to a reference medium.

12. A method according to claim 7, wherein after first and second agitation steps (b) and (c), the liquid medium to be analyzed and the reagent are subjected to a third agitation at a lower speed than said critical speed but closer to said critical speed than that of said second agitation.

13. A method according to claim 7, wherein before the first and second agitation steps (b) and (c), the mixture of the liquid medium to be analyzed and said reagent is subjected to centrifugation.

14. A method according to claim 10, wherein the photometric measurement across the transparent bottom of the vessel is carried out in the central zone of said bottom.

15. A method according to claim 10, wherein the photometric measurement across the transparent bottom of the vessel is carried out in the peripheral zone of said bottom.

16. A method according to claim 14, wherein the photometric measurement across the transparent bottom of the vessel is simultaneously carried out in the central and peripheral zones of said bottom.

17. An apparatus for the analysis of a liquid medium which can with at least one suitable reagent give rise to a deposit such as an agglutinate or a precipitate comprising at least one vessel adapted to contain a mixture of said liquid medium and said reagent, an agitator with at least two speeds of which the first is greater and the second less than a critical speed above which the constituents of the possible deposit are dispersed in the medium and below which the constituents are gathered in the vicinity of the center of the bottom of the vessel, means for securing said vessel to the agitator, and means for photometrically measuring the optical characteristics of at least one portion of the medium for determining the degree of said deposit.

18. An apparatus according to claim 17, which is suited for serological analysis and blood typing.

19. An apparatus according to claim 18, wherein the agitator is a support disc subjected to a circular translatory movement.

20. An apparatus according to claim 18, wherein the agitator can be operated at a third speed which is less than said critical speed but closer to said critical speed than said second speed.

21. An apparatus according to claim 18, further comprising a centrifuge to treat the mixture of the liquid medium and the reagent prior to the action of said agitator. CM 22. An apparatus according to claim 18, wherein said vessel has an axis of symmetry of revolution and a transparent concave bottom, its shape being substantially that of a cupola connected to sidewalls inclined relative to the axis of symmetry of said vessel in such a manner that the vessel has a bulbous portion in the vicinity of said bottom.

23. An apparatus according to claim 22, wherein the sidewalls of the vessel are opaque.

24. An apparatus according to claim 18, for analyzing several liquid media each of which is capable of giving rise with a suitable reagent to a deposit such as agglutinates or precipitates, further comprising at least one support for a plurality of vessels distributed in groups, each group including at least as many vessels as the number of reagents to be reacted in the predetermined medium to be analyzed, means for introducing into each vessel the liquid medium to be analyzed and the corresponding reagent, means for controlling the movement of the support for bringing each group successively in front of the introducing means, and means for brining each group of vessels after any centrifugation and the agitation in alignment with the photometric measuring means.

25. An apparatus according to claim 24, further comprising means for storing several vessel supports during a length of time sufficient to enable the reagents to react, storing means being disposed between the means for introducing the mixture of the medium to be analyzed and the corresponding reagent into each of the vessels and any centrifuge or agitator.

26. An apparatus according to claim 25, for the automated analysis of liquid media which with suitable reagent is capable of giving rise to a solid phase deposit as an agglutinate or a precipitate, wherein the means for introducing the mixture of a medium to be analyzed and a reagent into each one of the vessels comprise first pumping probes adapted to be immersed into receptacles each of which contains a sample of the liquid medium to be analyzed, means for controlling the first probes so that said probes carry a fraction of the sample into the reaction vessel, second pumping probes adapted to be immersed into receptacles each of which contains a reagent, and means for controlling said second probes so that they carry a fraction of the reagent to the reaction vessel.

27. An apparatus according to claim 24, for serological analysis and blood typing, further comprising a first pump for carrying to a first receptacle a fraction of the cell pack of a sedimented blood sample, means for carrying a diluent into a second receptacle for forming with the cell pack fraction thus tapped off as a cell suspension, means for tapping off a fraction of the said suspension and carrying it to the reaction vessel, means for tapping off a fraction of the plasma of the blood sample and carrying it to a second reaction vessel, and means for carrying the appropriate reagents to the said reaction vessels containing a plasma fraction and a diluted cell pack fraction.

28. An apparatus according to claim 27, further comprising means for displacing the receptacles on a table between an inlet station and an outlet station of the apparatus.

29. An apparatus according to claim 27, wherein the first and second receptacles are associated by pairs, the apparatus further comprising means for displacing a multiplicity of said pairs on a conveyor device between an inlet station and an outlet station of the apparatus for successively bringing the said pairs of receptacles under different pumping probes.

30. An apparatus according to claim 24, wherein the photometric measuring means comprise a mask provided with a central opening and a peripheral opening, two photoelectric cells disposed behind one another and each being adapted to receive respectively a light flux from a source disposed at the other side of the vessel relative to the mask and which traverses the peripheral and central zones of the medium contained in the vessel, and a lens system along the path of the light flux in front of each photoelectric cell.

31. An apparatus according to claim 24, wherein the photometric measuring means comprise twice as many photoelectric cells as there are vessels in each group on a support.

32. An apparatus according to claim 30, further including an electronic assembly for evaluating the photometric measurements, said assembly comprising comparison means and a threshold signals generator, said comparison means comparing each absolute measurement signal issuing from the photoelectric cell associated with a peripheral reader or relative measurement signals relative to a reference signal, with, for each reaction, the threshold signals emitted by said generator, these threshold signals generally corresponding to the absence of solid phase deposit or the presence of a solid phase deposit, as the absence of agglutination or the presence of agglutination.

33. An apparatus according to claim 32, wherein the electronic evaluating assembly comprises a second signal generator providing for each reaction a threshold signal whose level is included between that corresponding to the total absence of a solid phase deposit and that corresponding to a solid phase deposit, this second generator being selectively connected to said comparison means so that the threshold signal which it emits is compared with the measurement signals issued from the photoelectric cell associated with a central reader.

34. An apparatus according to claim 33, further comprising a logic device following the electronic evaluating assembly for interpreting the indications provided by said assembly.

35. An apparatus according to claim 34, further comprising an electromechanical assembly adapted to read information carried on identification slips and cards associated with the receptacle containing a sample of the liquid to be analyzed as well as recording the results issued by the electronic interpreting device.

36. An apparatus according to claim 34, wherein the electronic evaluating assembly and the logic device are connected to a data processing machine.

37. An apparatus according to claim 36, wherein said data processing machine is a printer or card puncher.

38. An apparatus according to claim 35, wherein the electromechanical assembly reads the card associated with a receptacle at the moment the results of the reactions of a group of vessels corresponding to this receptacle are subjected to photometric measurement.

* * * * *